US008529073B2

(12) United States Patent
Jung et al.

(10) Patent No.: US 8,529,073 B2
(45) Date of Patent: Sep. 10, 2013

(54) DISPLAY DEVICE AND DISPLAY MODULE

(75) Inventors: Bupsung Jung, Seoul (KR); Heewon Kwon, Seoul (KR); Hoon Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 13/035,359

(22) Filed: Feb. 25, 2011

(65) Prior Publication Data

US 2011/0242492 A1    Oct. 6, 2011

Related U.S. Application Data

(60) Provisional application No. 61/308,896, filed on Feb. 27, 2010.

(30) Foreign Application Priority Data

Mar. 15, 2010  (KR) .................. 10-2010-0022832

(51) Int. Cl.
*G03B 21/20* (2006.01)

(52) U.S. Cl.
USPC .................. 353/85; 353/30; 353/31; 353/69; 353/84; 353/99; 345/102; 348/333.12

(58) Field of Classification Search
USPC ................. 353/30, 31, 69, 70, 76, 84, 85, 94, 353/98, 99, 122; 345/102, 600–634; 362/27, 362/612, 613, 621, 97.3; 348/222.1, 223.1, 348/333.12, 441, 445, 452, 556; 349/5, 7–9, 349/58, 61, 65
See application file for complete search history.

(56) References Cited

U.S. PATENT DOCUMENTS

| 6,903,716 | B2 * | 6/2005 | Kawabe et al. | 345/99 |
|---|---|---|---|---|
| 7,847,912 | B2 * | 12/2010 | Nishizawa et al. | 349/160 |
| 7,965,270 | B2 * | 6/2011 | Kawabe et al. | 345/89 |
| 2004/0036805 | A1 * | 2/2004 | Nevins et al. | 348/556 |
| 2008/0088740 | A1 * | 4/2008 | Kondo | 348/556 |
| 2010/0110157 | A1 * | 5/2010 | Yonehara et al. | 347/130 |
| 2010/0265313 | A1 * | 10/2010 | Liu et al. | 348/36 |

* cited by examiner

*Primary Examiner* — Georgia Y Epps
*Assistant Examiner* — Sultan Chowdhury
(74) *Attorney, Agent, or Firm* — KED & Associates, LLP

(57) ABSTRACT

A display module includes a plurality of light sources that emit light toward a display panel having a screen with a first aspect ratio. An image with a second aspect ratio different from the first aspect ratio is displayed in the first region and not in the second region, and one or more light sources corresponding to the second region are selectively turned off so that luminance of the first region is different from luminance of a second region.

19 Claims, 25 Drawing Sheets

(a)

(b)

(c)

(a)

(b)

(c)

DISPLAY DEVICE AND DISPLAY MODULE

This application claims the benefit of and priority to U.S. Provisional Patent Application Ser. No. 61/308,896, filed on Feb. 27, 2010, and benefit of and priority to Korean Patent Application No. 10-2010-0022832, filed on Mar. 15, 2010. The contents of both applications are incorporated herein by reference.

BACKGROUND

1. Field

One or more embodiments described herein relate to displays.

2. Background

Various display devices have been developed including but not limited to liquid crystal displays (LCDs), plasma display panels (PDPs), electroluminescent displays (ELDs), and vacuum fluorescent displays (VFDs). Of particular interest is a liquid crystal display panel of the liquid crystal display includes a liquid crystal layer between a thin film transistor (TFT) substrate and a color filter substrate. The panel displays an image using light provided by a backlight unit of the liquid crystal display. In spite of their varied uses, LCDs and other types of display panels require improvements.

DETAILED DESCRIPTION

Figure 1:
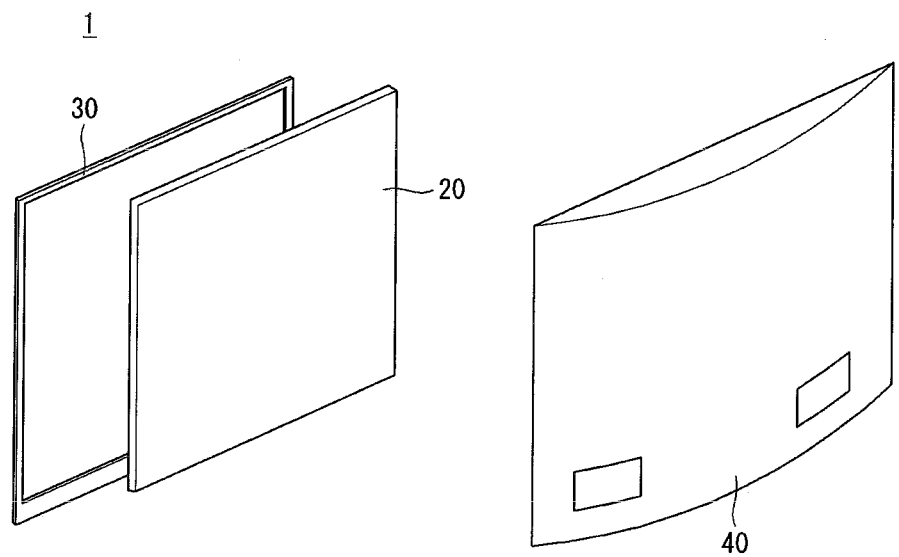
FIG. 1 shows one embodiment of a display device.

FIG. 1 shows one embodiment of a display device 1 which include a front cover 30, a back cover 40, and a display module 20 between the front cover 30 and the back cover 40.

The front cover 30 may cover the display module 20 and may include a front panel (not shown) formed of a substantially transparent material capable of transmitting light. The front panel is positioned over a front surface of the display module 20 to be spaced apart from the front surface of the display module 20 at a predetermined distance, thereby protecting the display module 20 from an external impact.

Figure 2:
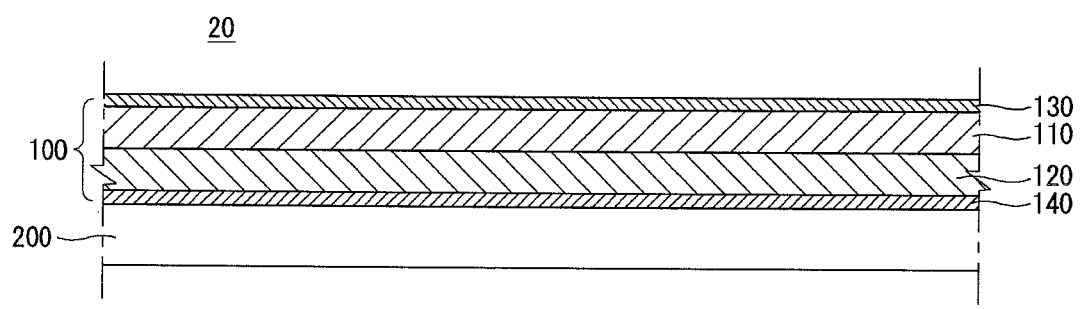
FIG. 2 shows a cross-sectional view of the display device.

FIG. 2 shows a cross-sectional view of the display device in FIG. 1. As shown in FIG. 2, the display module 20 of the display device 1 may include a display panel 100 and a backlight unit 200.

The display panel 100 includes a color filter substrate 110 and a thin film transistor (TFT) substrate 120 that are positioned opposite each other and are attached to each other with a uniform cell gap therebetween. A liquid crystal layer (not shown) may be interposed between the color filter substrate 110 and the TFT substrate 120.

The color filter substrate 110 includes a plurality of pixels each including red (R), green (G), and blue (B) subpixels and may generate a red, green, or blue image when light is applied to the pixels. In this embodiment, each of the pixels includes the red, green, and blue subpixels. Other structures may be used for the pixel. For example, each pixel may include red, green, blue, and white (W) subpixels.

The TFT substrate 120 includes one or more switching elements and may switch on and off corresponding pixel electrodes.

The liquid crystal layer is comprised of liquid crystal molecules. The arrangement of the liquid crystal molecules may vary depending on a voltage difference between a pixel electrode (not shown) and a common electrode (not shown). Hence, light provided by the backlight unit 200 may be incident on the color filter substrate 110 based on changes in the arrangement of the liquid crystal molecules of the liquid crystal layer.

An upper polarizing plate 130 and a lower polarizing plate 140 may be respectively positioned on an upper surface and a lower surface of the display panel 100. More particularly, the upper polarizing plate 130 may be positioned on an upper surface of the color filter substrate 110, and the lower polarizing plate 140 may be positioned on a lower surface of the TFT substrate 120.

A gate driver (not shown) and a data driver (not shown), each of which generates a driving signal for driving the display panel 100, may be provided on the side of the display panel 100. The above-described configuration of the display panel 100 is merely one example; other configurations may be used for the display panel 100.

As shown in FIG. 2, the display module 20 may be configured so that the backlight unit 200 adheres closely to the display panel 100. For example, the backlight unit 200 may be attached and fixed to the lower surface of the display panel 100, more particularly the lower polarizing plate 140. For this, an adhesive layer (not shown) may be formed between the lower polarizing plate 140 and the backlight unit 200.

As described above, because the display device 1 is configured by closely attaching the backlight unit 200 to the display panel 100, the entire thickness of the display device 1 may be reduced. Hence, an external appearance of the display device 1 may be improved.

Further, because a structure for fixing the backlight unit 200 is removed, the structure and the manufacturing process of the display device 1 may be simplified.

Further, because a space between the backlight unit 200 and the display panel 100 is reduced, foreign substances may be prevented from penetrating into the space. Hence, a malfunction of the display device 1 and a reduction in the image quality of the display device 1 resulting from the foreign substances may be prevented.

In this embodiment, the backlight unit 200 may have a structure in which a plurality of functional layers are sequentially stacked, and at least one of the plurality of functional layers may include a plurality of light sources (not shown).

Each of the plurality of functional layers constituting the backlight unit 200 may be formed of a flexible material, so that the backlight unit 200 is closely attached and fixed to the lower surface of the display panel 100. Further, a bottom cover (not shown) for stably positioning the backlight unit 200 may be provided under the backlight unit 200.

The display panel 100 according to one embodiment may be divided into a plurality of regions. Brightness (i.e., brightness of the corresponding light source) of light emitted from a region of the backlight unit 200 corresponding to each of the divided regions of the display panel 100 is adjusted based on a gray peak value or a color coordinate signal of each divided region. Hence, a luminance of the display panel 100 may be adjusted. For this, the backlight unit 200 may operate, so that regions of the backlight unit 200 respectively corresponding to the divided regions of the display panel 100 are dividedly driven.

Figure 3:
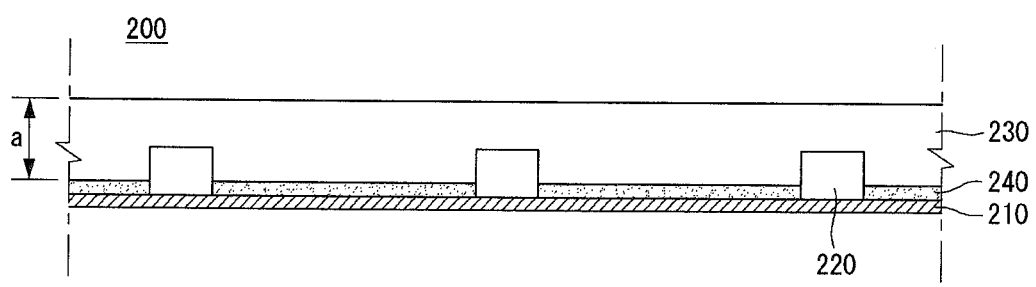
FIG. 3 shows one embodiment of a backlight unit.

FIG. 3 is a cross-sectional view of one embodiment of the backlight unit. As shown in FIG. 3, the backlight unit 200 may include a substrate 210, a plurality of light sources 220, a resin layer 230, and a reflection layer 240.

The plurality of light sources 220 may be formed on the substrate 210, and the resin layer 230 may be formed on the substrate 210 to cover the light sources 220.

A connector (not shown) and an electrode pattern (not shown) for connecting the light sources 220 to one another may be formed on the substrate 210. For example, a carbon nanotube electrode pattern (not shown) for connecting the light sources 220 to the connector may be formed on an upper surface of the substrate 210. The connector may be electrically connected to a power supply unit (not shown) for supplying a power to the light sources 220.

The substrate 210 may be a printed circuit board (PCB) formed of polyethylene terephthalate (PET), glass, polycarbonate (PC), or silicon. Further, the substrate 210 may be a film substrate.

The light source 220 may be one of a light emitting diode (LED) chip and a light emitting diode package having at least one light emitting diode chip. In the embodiment of the invention, the light emitting diode package is described as an example of the light source 220.

The light source 220 may be configured by a colored LED emitting at least one of red light, green light, blue light, etc. or a white LED emitting white light. In addition, the colored LED may include at least one of a red LED, a blue LED, and a green LED. The disposition and emitting light of the light emitting diode may be variously changed within a technical scope of the embodiment.

The resin layer 230 positioned on the substrate 210 transmits light emitted from the light sources 220, and at the same time diffuses the light emitted from the light sources 220, thereby allowing the light sources 220 to uniformly provide the light to the display panel 100.

The reflection layer 240 may be positioned between the substrate 210 and the resin layer 230, more particularly on the upper surface of the substrate 210. The reflection layer 240 may reflect light emitted from the light sources 220 and may again reflect light totally reflected from a boundary between the resin layer 230 and the reflection layer 240, thereby more widely diffusing the light emitted from the light sources 220.

The reflection layer 240 may select a sheet in which a white pigment, for example, titan white is dispersed, a sheet in which a metal deposition layer is stacked on the surface of the sheet, a sheet in which bubbles are dispersed so as to scatter light, etc. among various types of sheets formed of synthetic resin material. Silver (Ag) may be coated on the surface of the reflection layer 240 so as to increase a reflectance. The reflection layer 240 may be formed by coating a resin on the upper surface of the substrate 210.

The resin layer 230 may be formed of various kinds of resins capable of transmitting light. For example, the resin layer 230 may contain one or at least two selected from the group consisting of polyethylene terephthalate (PET), polycarbonate (PC), polypropylene, polyethylene, polystyrene, polyepoxy, silicon, acryl, etc.

Further, a refractive index of the resin layer 230 may be approximately 1.4 to 1.6, so that the backlight unit 200 has a uniform luminance by diffusing light emitted from the light sources 220.

The resin layer 230 may contain a polymer resin having an adhesion so as to tightly and closely adhere to the light sources 220 and the reflection layer 240. For example, the resin layer 230 may contain an acrylic resin such as unsaturated polyester, methyl methacrylate, ethyl methacrylate, isobutyl methacrylate, normal butyl methacrylate, normal butylmethylmethacrylate, acrylic acid, methacrylic acid, hydroxy ethylmethacrylate, hydroxy propylmethacrylate, hydroxy ethylacrylate, acrylamide, methylol acrylamide, glycidyl methacrylate, ethylacrylate, isobutylacrylate, normal butylacrylate, 2-ethylhexyl acrylate polymer, copolymer, or terpolymer, etc., an urethane resin, an epoxy resin, a melamine resin, etc.

The resin layer 230 may be formed by coating and curing a liquid or gel-type resin on the upper surface of the substrate 210 on which the light sources 220 and the reflection layer 240 are formed. Alternatively, the resin layer 230 may be separately manufactured and then may be attached to the upper surface of the substrate 210.

As a thickness "a" of the resin layer 230 increases, light emitted from the light sources 220 may be more widely diffused. Hence, the backlight unit 200 may provide light having the uniform luminance to the display panel 100. However, as the thickness "a" of the resin layer 230 increases, an amount of light absorbed in the resin layer 230 may increase. Hence, the luminance of light which the backlight unit 200 provides to the display panel 100 may entirely decrease. Accordingly, the thickness "a" of the resin layer 230 may be approximately 0.1 mm to 4.5 mm, so that the backlight unit 200 can provide light having the uniform luminance to the display panel 100 without an excessive reduction in the luminance of light.

Figure 4:
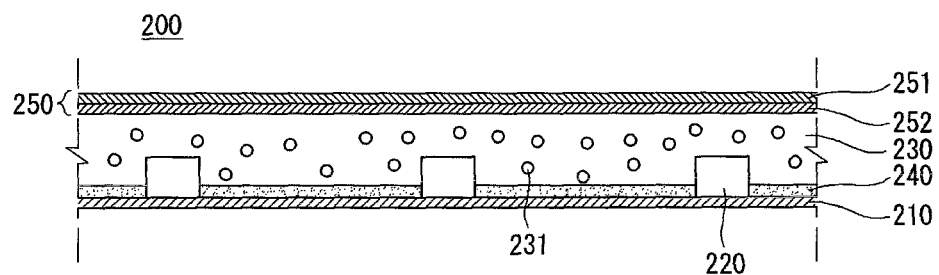
FIG. 4 shows another embodiment of a backlight unit.

FIG. 4 shows another embodiment of the backlight unit. In this embodiment, the plurality of light sources 220 may be mounted on the substrate 210, and the resin layer 230 may be disposed on the upper surface of the substrate 210. The reflection layer 240 may be formed between the substrate 210 and the resin layer 230.

The resin layer 230 may include a plurality of scattering particles 231. The scattering particles 231 may scatter or refract light incident on the resin layer 230, thereby more widely diffusing light emitted from the light sources 220.

The scattering particles 231 may be formed of a material having a refractive index different from a formation material of the resin layer 230 so as to scatter or refract the light emitted from the light source 220. More particularly, the scattering particles 231 may be formed of a material having a refractive index greater than silicon-based resin or acrylic resin forming the resin layer 230.

For example, the scattering particles 231 may be formed of polymethylmethacrylate (PMMA)/styrene copolymer (MS), polymethylmethacrylate (PMMA), polystyrene (PS), silicon, titanium dioxide (TiO2), and silicon dioxide (SiO2), or a combination thereof. Further, the scattering particles 231 may be formed of a material having a refractive index less than the formation material of the resin layer 230.

For example, the scattering particles 231 may be formed by generating bubbles in the resin layer 230. Other materials may be used for the scattering particles 231. For example, the scattering particle 231 may be formed using various polymer materials or inorganic particles.

In this embodiment, scattering particles 231 may be formed of a material having a refractive index than less a formation material of resin layer 230. For example, the scattering particles 231 may be formed by forming bubbles in the resin layer 230. A formation material of the scattering particles 231 is not limited to the above-described material and may be formed of various polymer materials or various inorganic materials.

In one embodiment, the resin layer 230 may be formed by mixing the liquid or gel-type resin with the scattering particles 231 and then coating and curing a mixture on the upper surface of the substrate 210 on which the light sources 220 and the reflection layer 240 are formed.

As shown in FIG. 4, an optical sheet 250 may be disposed on the top of the second layer 230. The optical sheet 250 may include at least one prism sheet 251 and/or at least one diffusion sheet 252. In this instance, a plurality of sheets constituting optical sheet 250 are not separated from one another and are attached to one another. Thus, the thickness of the optical sheet 250 or the thickness of the backlight unit 200 may be reduced.

A lower surface of the optical sheet 250 may closely adhere to the resin layer 230, and an upper surface of the optical sheet 250 may closely adhere to the lower surface of the display panel 110, i.e., the lower polarizing plate 140.

The diffusion sheet 252 may diffuse incident light to thereby prevent light coming from the resin layer 230 from being partially concentrated. Hence, the diffusion sheet 252 may further uniformize the luminance of light. Further, the prism sheet 251 may focus light coming from the diffusion sheet 252, thereby allowing the light to be vertically incident on the display panel 110.

In one embodiment, at least one of the prism sheet 251 and diffusion sheet 252 constituting the optical sheet 250 may be removed. The optical sheet 250 may further include other functional layers in addition to the prism sheet 251 and the diffusion sheet 252.

In a backlight unit which performs direct light emissions, an LED package constituting the light sources 220 may be classified into a top view type LED package and a side view type LED package based on a facing direction of a light emitting surface of the LED package.

FIGS. 5 to 8 illustrate a backlight unit which performs direct light emissions. More specifically, FIGS. 5 and 6 respectively illustrate a top view type LED package and a side view type LED package in the direct light emitting manner of the backlight unit.

Figure 5:
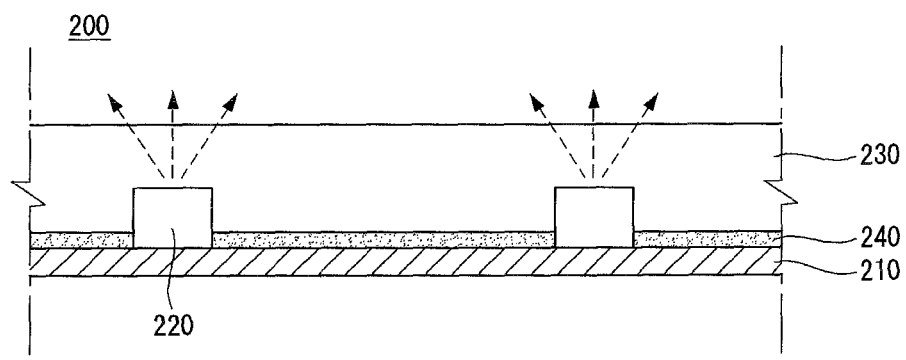
FIGS. 5 to 8 show backlight unit which performs direct light emission.

As shown in FIG. 5, each of the plurality of light sources 220 of the backlight unit 200 has a light emitting surface on an upper surface of each light source 220. Thus, the plurality of light sources 220 may emit light in an upward direction, for example, in a direction perpendicular to the substrate 210 or the reflection layer 240.

Figure 6:
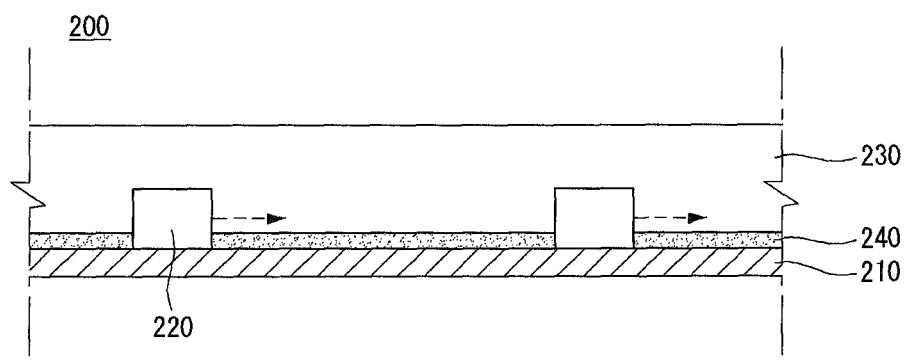

As shown in FIG. 6, each of the plurality of light sources 220 of the backlight unit 200 has the light emitting surface at the side of each light source 220. Thus, the plurality of light sources 220 may emit light in a lateral direction, for example, an extension direction of the substrate 210 or the reflection layer 240. For example, the plurality of light sources 220 may be configured using the side view type LED package. As a result, it is possible to reduce a problem that the light sources 220 are observed as a hot spot on the screen of the display panel 100. Furthermore, the thin profile of the display device 1 may be achieved because of a reduction of the thickness "a" of the resin layer 230.

Figure 7:
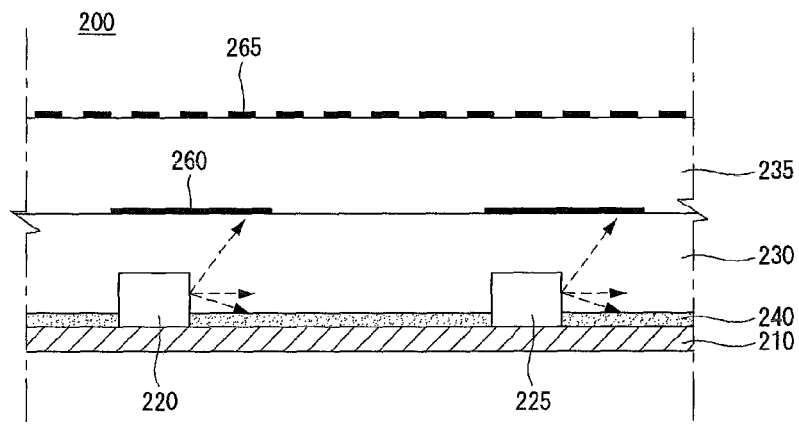

As shown in FIG. 7, the backlight unit 200 may include a plurality of resin layers 230 and 235. As shown in FIG. 7, light emitted from the side of the light source 220 may be transmitted by the first resin layer 230 and may travel in a formation area of a light source 225 adjacent to the light source 220.

A portion of light transmitted by the first resin layer 230 may be emitted in an upward direction corresponding to a direction of the display panel 100. For this, the first resin layer 230 may include a plurality of scattering particles 231 as described above with reference to FIG. 4 and may scatter or refract light travelling in the upward direction A portion of light emitted from the light source 220 may be incident on the reflection layer 240, and the light incident on the reflection layer 240 may be reflected and diffused in the upward direction.

A large amount of light may be emitted in an area around the light source 220 because of a strong scattering phenomenon around the light source 220 or light emitted from the light source 220 in a direction similar to the upward direction. Hence, light having a high luminance may be observed on the screen.

To prevent this, as shown in FIG. 7, a first light shielding pattern 260 may be formed on the first resin layer 230 to reduce a luminance of light emitted in an area around the light source 220. Hence, the backlight unit 200 may emit light having the uniform luminance. For example, the first light shielding pattern 260 may be formed on the first resin layer 230 corresponding to the formation area of the plurality of light sources 220 to shield a potion of light from the light source 220 and to transmit a portion of the remaining light. Hence, the first light shielding pattern 260 may reduce the luminance of light emitted upward.

The first light shielding pattern 260 may be formed of titanium dioxide (TiO2). In this instance, the first light shielding pattern 260 may reflect downward a potion of light from the light source 220 and may transmit a portion of the remaining light.

In one embodiment, a second resin layer 235 may be disposed on the first resins layer 230. The second resin layer 235 may be formed of the same material as or a different material from the first resins layer 230. The second resin layer 235 may diffuse light upward emitted from the first resins layer 230, thereby improving the uniformity of the luminance of light from the backlight unit 200.

The second resin layer 235 may be formed of a material having a refractive index equal to or different from the refractive index of the formation material of the first resins layer 230. When the second resin layer 235 is formed of the material having the refractive index greater than the refractive index of the first resins layer 230, the second resin layer 235 may widely diffuse light from the first resin layer 230.

When the second resin layer 235 is formed of the material having the refractive index less than the refractive index of the first resin layer 230, light from the first resin layer 230 may increase a reflectance of light reflected from a lower surface of the second resin layer 235. Hence, light from the light source 220 may easily travel along the first resin layer 230.

Each of the first resin layer 230 and the second resin layer 235 may include a plurality of scattering particles. In this instance, a density of the scattering particles of the second resin layer 235 may be greater than a density of the scattering particles of the first resin layer 230. When the second resin layer 235 includes the scattering particles having the density greater than the first resin layer 230, the second resin layer 235 may widely diffuse light upward emitted from the first resin layer 230. Hence, the uniformity of the luminance of light from the backlight unit 200 may be improved.

As shown in FIG. 7, a second light shielding pattern 265 may be formed on the second resin layer 235 to uniformize the luminance of light from the second resin layer 235. For example, when light upward emitted from the second resin layer 235 is concentrated in a specific potion and thus is observed on the screen as the light having the high luminance, the second light shielding pattern 265 may be formed in an area corresponding to a specific potion of an upper surface of the second resin layer 235. Hence, because the second light shielding pattern 265 may reduce the luminance of light in the specific potion, the luminance of light emitted from the backlight unit 200 may be uniform.

The second light shielding pattern 265 may be formed of titanium dioxide (TiO2). In this instance, the second light shielding pattern 265 may reflect downward a potion of light from the second resin layer 235 and may transmit a portion of the remaining light.

Figure 8:
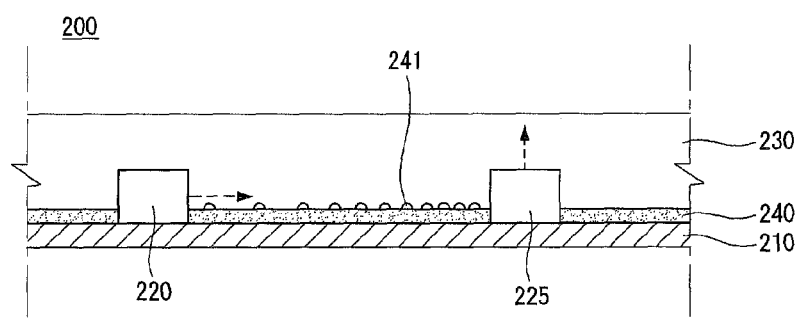

As shown in FIG. 8, a pattern may be formed on the reflection layer 240, thereby facilitating a travel of light emitted from the light source 220 to the light source 225 adjacent to the light source 220. The pattern on an upper surface of the reflection layer 240 may include a plurality of protrusions 241. Light that is emitted from the light source 220 and then is incident on the plurality of protrusions 241 may be scattered or refracted in a direction indicated by an arrow of FIG. 8.

As shown in FIG. 8, a density of the protrusions 241 formed on the reflection layer 240 may increase as a separated distance between the protrusions 241 and the light source 220 increases (i.e., as the protrusions 241 are close to the light source 225). Hence, a reduction in a luminance of upward emitted light in an area distant from the light source 220 (i.e., in an area near to the light source 225) may be prevented. As a result, the luminance of light provided by the backlight unit 200 may be uniformized.

The protrusions 241 may be formed of the same material as the reflection layer 240. In this instance, the protrusions 241 may be formed by processing the upper surface of the reflection layer 240. Alternatively, the protrusions 241 may be formed of a material different from the reflection layer 240. In this instance, the protrusions 241 may be formed by printing the pattern on the upper surface of the reflection layer 240. The shape of the protrusions 241 is not limited to a shape shown in FIG. 8 and may be variously changed. For example, other shapes such as a prism shape may be used.

Figure 9:
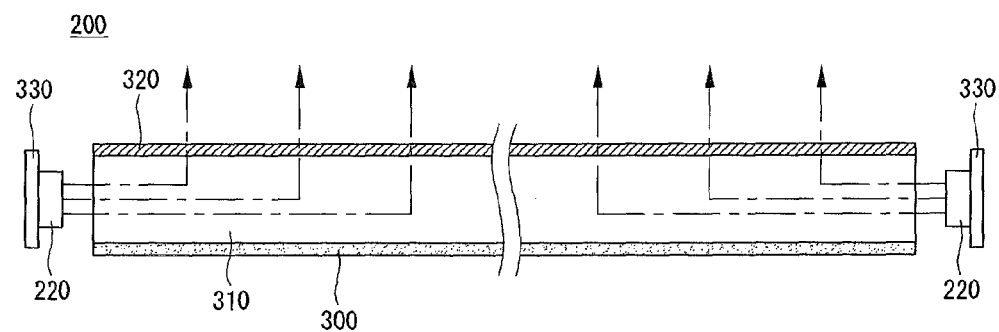
FIG. 9 shows a backlight unit which performs edge light emissions.
Figure 10:
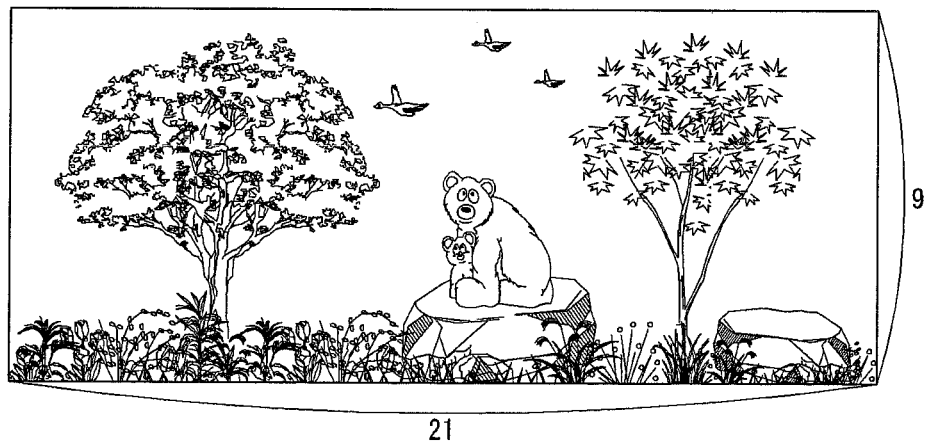
FIGS. 10 to 13 show one embodiment of an aspect ratio of a display device and an aspect ratio of an image displayed on the display device.
Figure 10:
Figure 10:

FIG. 9 shows a backlight unit which performs edge light emissions. As shown, the backlight unit 200 may include a reflection layer 300, a light guide plate 310, an optical sheet 320, a substrate 330, and light sources 220. Since configurations of the reflection layer 300, the optical sheet 320, and the light sources 220 are substantially the same as FIGS. 5 to 8, a further description may be briefly made or may be entirely omitted.

The light sources 220 may be positioned on the substrate 330. The substrate 330 may be positioned so that the light sources 220 emit light in a horizontal direction, i.e., to the side of the light guide plate 310. The light guide plate 310 may change a travelling direction of the light emitted in the horizontal direction to a vertical direction.

In the edge light emitting manner of the backlight unit 200, because the light sources 220 may be positioned on the side of the light guide plate 310, the thickness of the backlight unit 200 may be reduced.

FIGS. 10 to 13 shows an aspect ratio of the display device according to one embodiment and an aspect ratio of an image displayed on the display device. As shown in FIG. 10(a), the display panel of the display device according to one embodiment may have an aspect ratio of 21:9. The display panel may have a resolution of 1680×720, 1792×768, or 2520×1080 so that the display panel has the aspect ratio of 21:9. As above, when the aspect ratio of the display panel is 21:9, an image of a movie film or an image having a high resolution may be efficiently displayed without the distortion.

Alternatively, as shown in FIG. 10(b), the display panel of the display device according to another embodiment may have an aspect ratio of 16:9. The display panel may have a resolution of 852×480, 1280×720, 1366×768, or 1920×1080 so that the display panel has the aspect ratio of 16:9.

Alternatively, as shown in FIG. 10(c), the display panel of the display device according to another embodiment may have an aspect ratio of 4:3. The display panel may have a resolution of 640×480, 800×600, or 1024×768 so that the display panel has the aspect ratio of 4:3.

The display device according to the embodiments may display an image having an aspect ratio different from an aspect ratio of the display panel. In other words, when an aspect ratio of the display panel is a first aspect ratio, the display device may display an image having a second aspect ratio different from the first aspect ratio.

Figure 11:
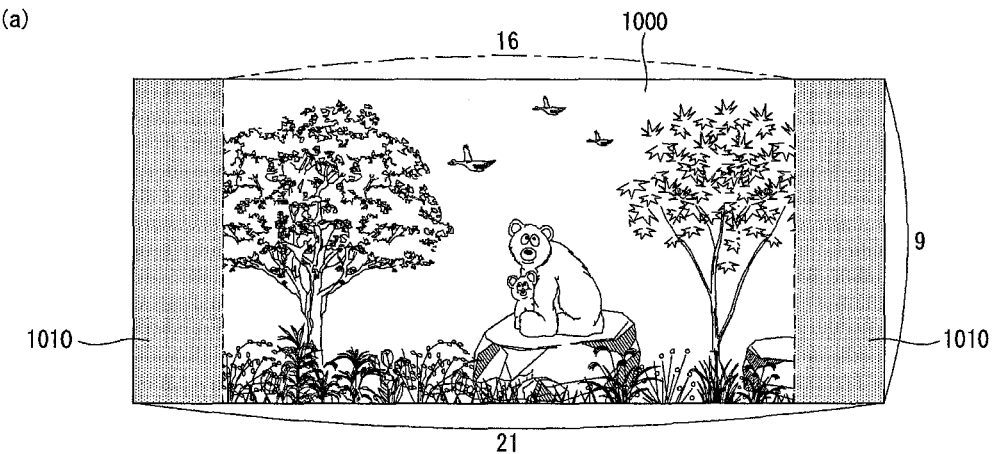
Figure 11:
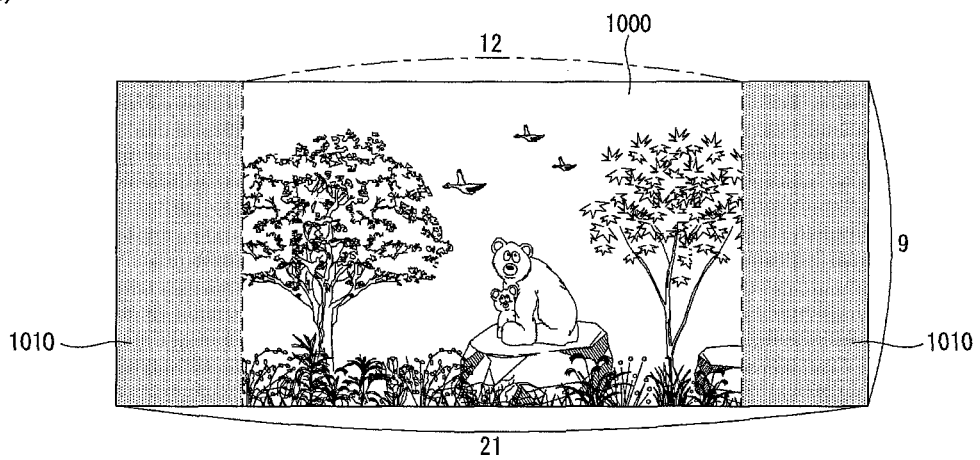
Figure 11:
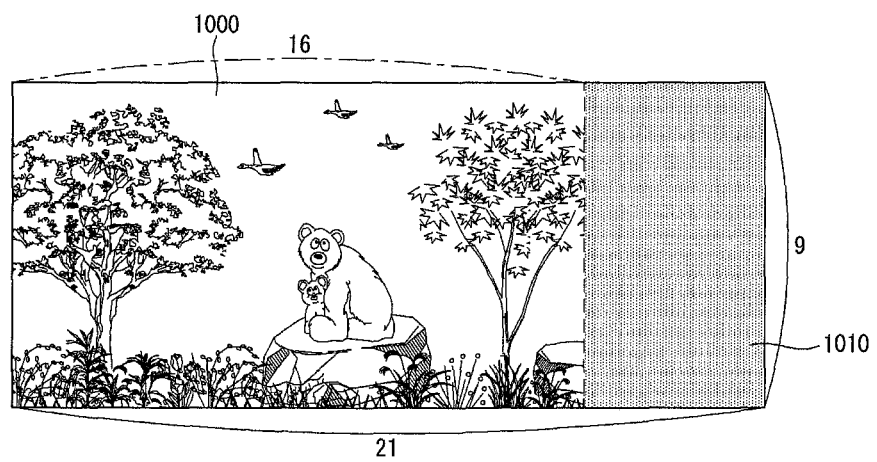

FIG. 11 shows the display device having an aspect ratio of 21:9. As shown in FIG. 11(a), an image having an aspect ratio of 16:9 may be displayed on the display panel of the display device having the aspect ratio of 21:9. In this instance, the image having the aspect ratio of 16:9 may be displayed on a first region 1000 of a display region of the display panel, and the image may not be displayed on second regions 1010 positioned on left and right sides of the first region 1000. As a result, the image having the aspect ratio of 16:9 may be displayed on the display panel having the aspect ratio of 21:9. In FIG. 11, the first region 1000 may be referred to as a main region, and the second region 1010 may be referred to as a subsidiary region.

Alternatively, as shown in FIG. 11(b), an image having an aspect ratio of 4:3 may be displayed on the display panel of the display device having the aspect ratio of 21:9. In this instance, the image having the aspect ratio of 4:3 may be displayed on the first region 1000 of the display panel, and the image may not be displayed on the second regions 1010. As a result, the image having the aspect ratio of 4:3 may be displayed on the display panel having the aspect ratio of 21:9. The size of the first region 1000 of FIG. 11(b) may be less than the size of the first region 1000 of FIG. 11(a), and the size of the second region 1010 of FIG. 11(b) may be greater than the size of the second region 1010 of FIG. 11(a).

Alternatively, as shown in FIG. 11(c), the second region 1010 may be disposed on only one of the left and right sides of the first region 1000. In other words, FIGS. 11(a) and 11(b) illustrate two second regions 1010, and FIG. 11(c) illustrates one second region 1010.

Figure 12:
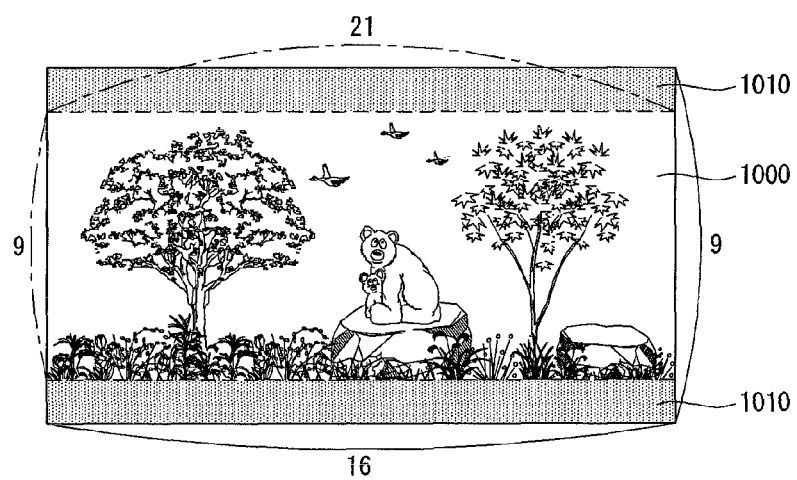
Figure 12:
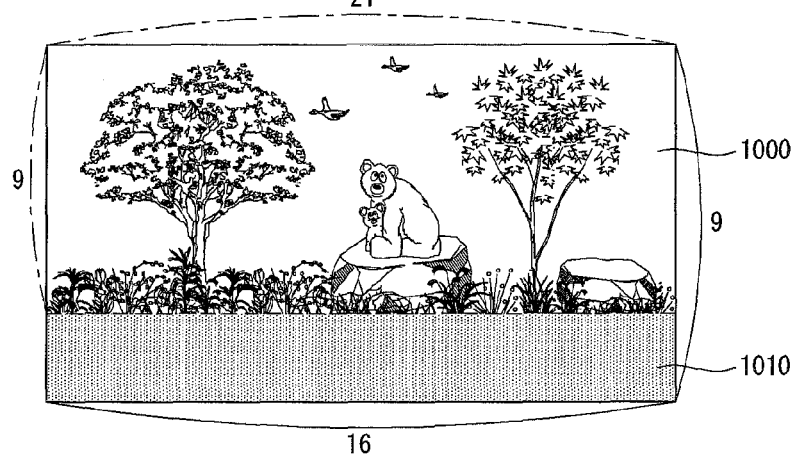
Figure 12:
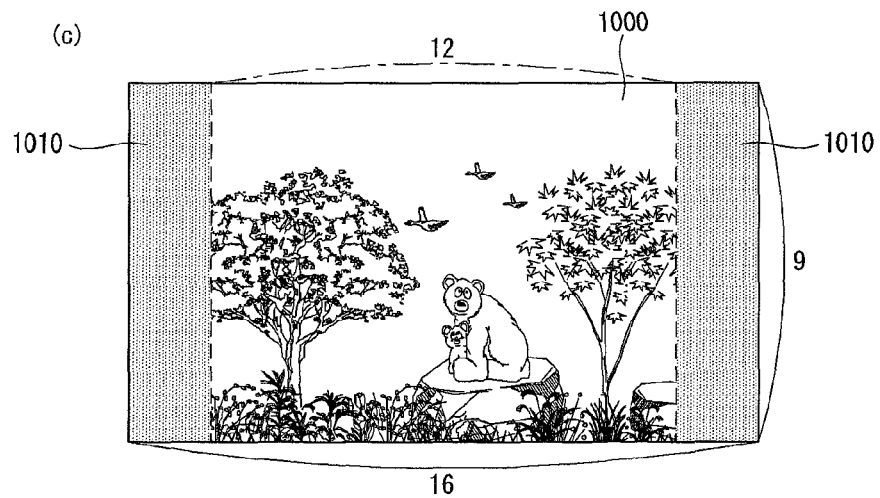

FIG. 12 illustrates the display device having an aspect ratio of 16:9. As shown in FIG. 12(a), an image having an aspect ratio of 21:9 may be displayed on the display panel of the display device having the aspect ratio of 16:9. In this instance, the image having the aspect ratio of 21:9 may be displayed on a first region 1000 of a display region of the display panel, and the image may not be displayed on second regions 1010 positioned on upper and lower sides of the first region 1000. As a result, the image having the aspect ratio of 21:9 may be displayed on the display panel having the aspect ratio of 16:9.

Alternatively, as shown in FIG. 12(b), the second region 1010 may be disposed on only one of the upper and lower sides of the first region 1000. In other words, the second region 1010 of FIG. 12(b) may indicate a combination of the two second regions 1010 of FIG. 12(a).

Alternatively, as shown in FIG. 12(c), an image having an aspect ratio of 4:3 may be displayed on the display panel of the display device having the aspect ratio of 16:9. In this instance, the image having the aspect ratio of 4:3 may be displayed on the first region 1000 of the display region of the display panel, and the image may not be displayed on second regions 1010 positioned on left and right sides of the first region 1000. As a result, the image having the aspect ratio of 4:3 may be displayed on the display panel having the aspect ratio of 16:9. Although it is not shown, the two second regions 1010 may be combined into one second regions 1010 in the same manner as FIG. 11(c).

Figure 13:
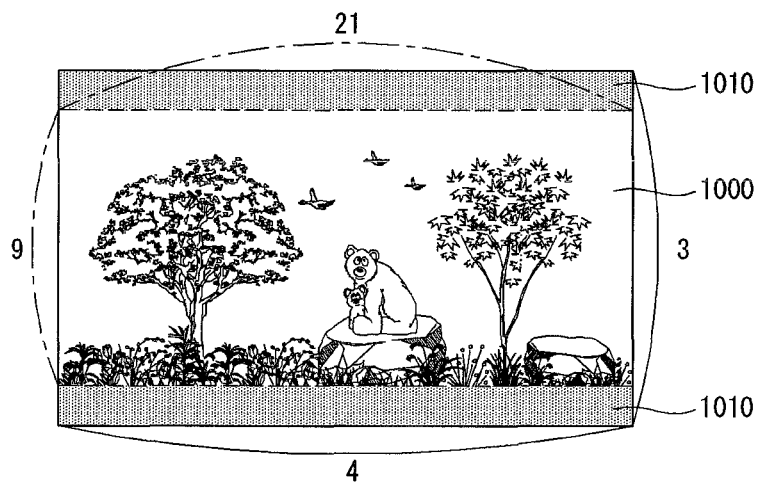
Figure 13:
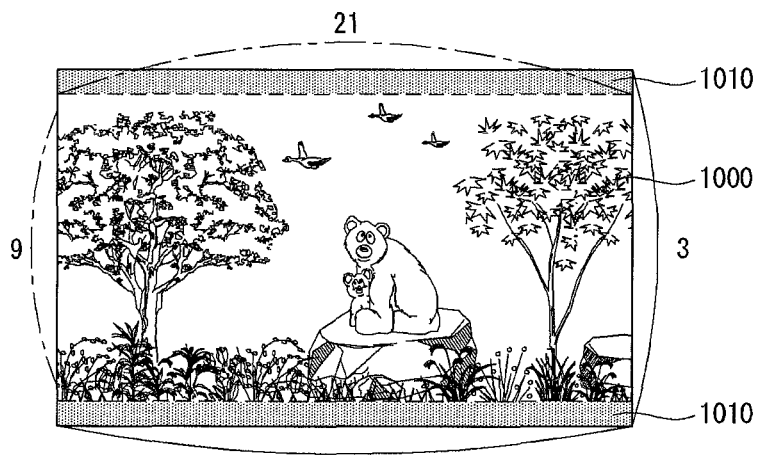
Figure 13:
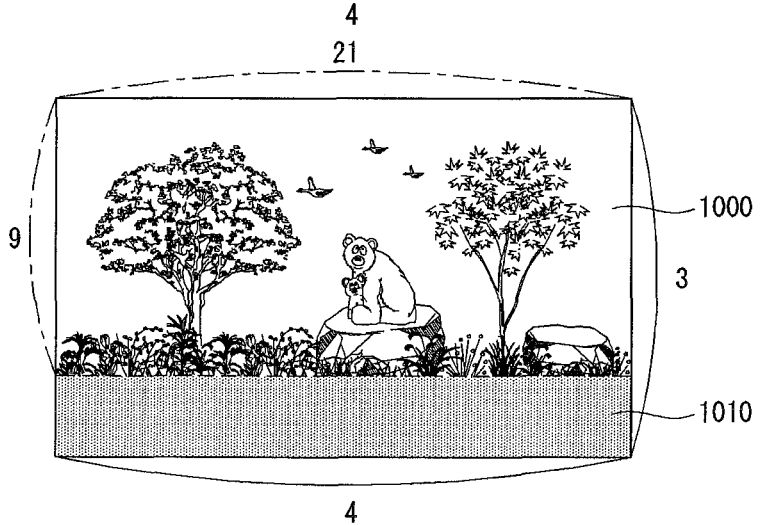

FIG. 13 illustrates the display device having an aspect ratio of 4:3. As shown in FIG. 13(a), an image having an aspect ratio of 21:9 may be displayed on the display panel of the display device having the aspect ratio of 4:3. In this instance, the image having the aspect ratio of 21:9 may be displayed on a first region 1000 of a display region of the display panel, and the image may not be displayed on second regions 1010 positioned on upper and lower sides of the first region 1000. As a result, the image having the aspect ratio of 21:9 may be displayed on the display panel having the aspect ratio of 4:3.

Alternatively, as shown in FIG. 13(b), an image having an aspect ratio of 16:9 may be displayed on the display panel of the display device having the aspect ratio of 4:3. In this instance, the image having the aspect ratio of 16:9 may be displayed on the first region 1000 of the display region of the display panel, and the image may not be displayed on the second regions 1010 positioned on upper and lower sides of the first region 1000. As a result, the image having the aspect ratio of 16:9 may be displayed on the display panel having the aspect ratio of 4:3.

Alternatively, as shown in FIG. 13(c), the second region 1010 may be disposed on only one of the upper and lower sides of the first region 1000. In other words, the second region 1010 of FIG. 13(c) may indicate a combination of the two second regions 1010 of FIGS. 13(a) and 13(b).

As described above, the display panel of the display device according to the exemplary embodiments may have the aspect ratio of 21:9, 16:9 or 4:3. Other aspect ratios may be used in other embodiments.

The image having a predetermined aspect ratio is displayed on the first region 1000 of the display panel, and a luminance of the second region 1010 adjacent to the first region 1000 may be set to be less than a luminance of the first region 1000. In this instance, power consumption may be reduced, and the image displayed on the first region 1000 may be more remarkably displayed. Preferably, the luminance of the second region 1010 may be less than the luminance of the first region 1000 at the same gray level.

A luminance of at least one of the plurality of light sources positioned at a location corresponding to the second region 1010 may be less than a luminance of the light sources positioned at a location corresponding to the first region 1000, so that the luminance of the second region 1010 is less than the luminance of the first region 1000. Further, at least one light source corresponding to the second region 1010 may be turned off. This is described below.

Figure 14:
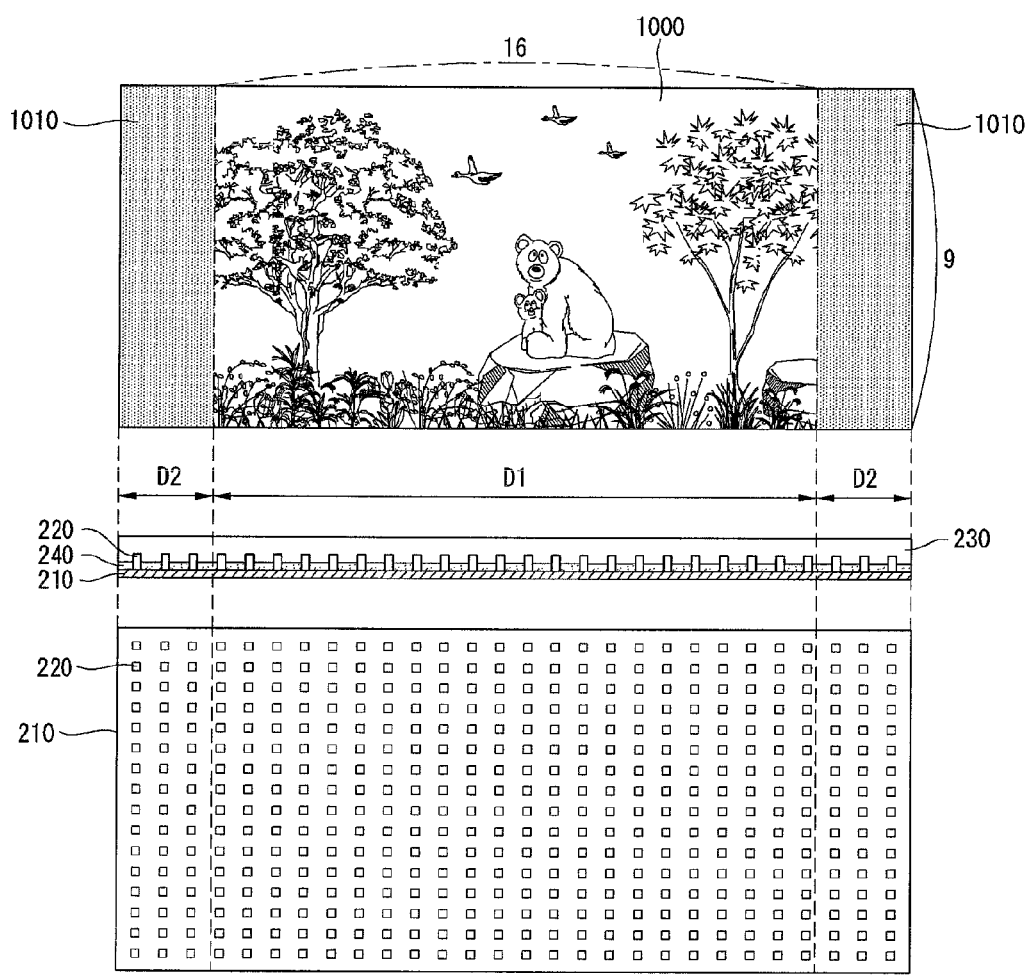
FIGS. 14 to 20 show one embodiment of a method for selectively turning off light sources based on aspect ratio.

FIGS. 14 to 20 show one embodiment of a method for selectively turning off light sources based on an aspect ratio. Although FIG. 14 illustrates the light sources 220 implemented as the top view type LED package, the side view type LED package may be used as the light sources 220.

Moreover, FIGS. 14 to 20 illustrate an example where an image having an aspect ratio of 16:9 is displayed on the display region of the display panel having an aspect ratio of 21:9. However, the description of FIGS. 14 to 20 may be substantially equally applied to any case where an image having an aspect ratio different from an aspect ratio of the display panel is displayed on the display region of the display panel.

More specifically, the description of FIGS. 14 to 20 may be substantially equally applied to a case where the image having the aspect ratio of 4:3 is displayed on the display region of the display panel having the aspect ratio of 21:9, a case where the image having the aspect ratio of 21:9 is displayed on the display region of the display panel having the aspect ratio of 16:9, a case where the image having the aspect ratio of 4:3 is displayed on the display region of the display panel having the aspect ratio of 16:9, a case where the image having the aspect ratio of 21:9 is displayed on the display region of the display panel having the aspect ratio of 4:3, and a case where the image having the aspect ratio of 16:9 is displayed on the display region of the display panel having the aspect ratio of 4:3.

FIG. 14 illustrates the case where the image having the aspect ratio of 16:9 is displayed on the display region of the display panel having the aspect ratio of 21:9. In this instance, the image having the aspect ratio of 16:9 may be displayed on a first region 1000 of the display region of the display panel having the aspect ratio of 21:9 and may not be displayed on a second region 1010.

Further, at least one light source 220 positioned at a location corresponding to the second region 1010 may be turned off. Preferably, all of the light sources 220 positioned at the location corresponding to the second region 1010 may be turned off. Hence, the power consumption may be reduced. Further, all of the light sources 220 positioned at a location corresponding to the first region 1000 may be turned on, or at least one light source 220 positioned at the location corresponding to the first region 1000 may be selectively turned off.

In FIG. 14, D1 indicates the location corresponding to the first region 1000, and D2 indicates the location corresponding to the second region 1010.

In other words, when an aspect ratio of the display region of the display panel is a first aspect ratio (for example, 21:9) and an image having a second aspect ratio (for example, 16:9) different from the first aspect ratio is displayed on the display region of the display panel, the image having the second aspect ratio may be displayed on the first region of the display region and at least one light source 220 positioned at the location corresponding to the second region 1010 may be turned off.

Alternatively, at least one of the plurality of light sources may be selectively turned off based on an aspect ratio of input video data. More specifically, when the aspect ratio of the input video data is different from the aspect ratio of the display region of the display panel, at least one light source may be turned off. In this instance, the turned-off light source may be positioned in a region out of the aspect ratio of the image.

Figure 15:
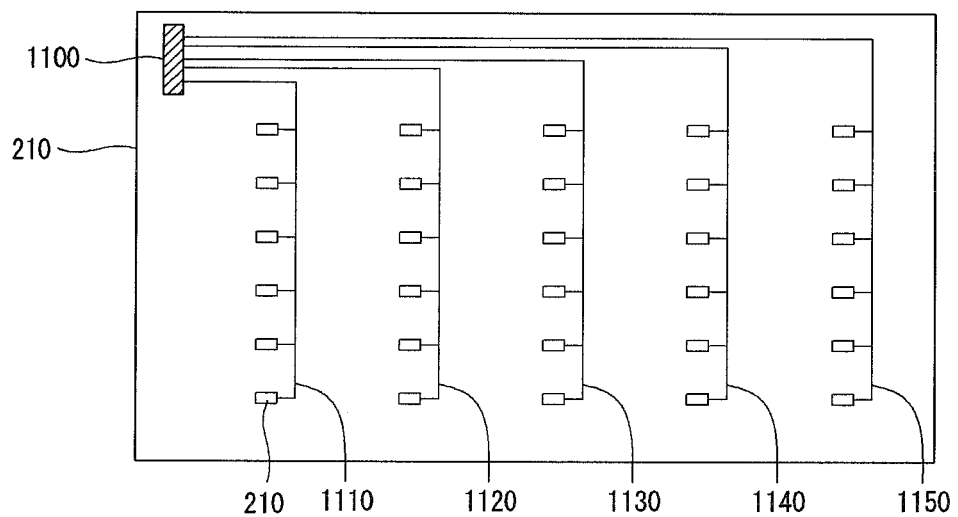

As above, any two light sources have to be independently driven so as to turn off at least one light source based on the aspect ratio of the input video data. For example, as shown in FIG. 15, the plurality of light sources 220 may be electrically connected to a first line 1110, and the plurality of light sources 220 may be electrically connected to a second line 1120 electrically separated from the first line 1110. The plurality of light sources 220 may be electrically connected to each of third, fourth, and fifth lines 1130, 1140, and 1150 in the same manner as the first and second lines 1110 and 1120.

Further, the first to fifth lines 1110-1150 may be connected to a connector 1100 and may receive electric power from a power supply unit (not shown) through the connector 1100.

In the structure illustrated in FIG. 15, the electric power may be supplied to the first and second lines 1110 and 1120, the supply of the electric power to the third to fifth lines 1130-1150 may be cut off, the plurality of light sources 220 connected to the first and second lines 1110 and 1120 may be turned on, and the plurality of light sources 220 connected to the third to fifth lines 1130-1150 may be turned off. At least one of the plurality of light sources 220 may be turned off based on the aspect ratio of the input video data through the above-described method.

FIG. 15 illustrates the method for selectively turning off at least one of the plurality of light sources 220 positioned on one substrate 210 based on the aspect ratio of the input video data. The substrate 210 may be divided based on a specific aspect ratio, unlike the method illustrated in FIG. 15.

Figure 16:
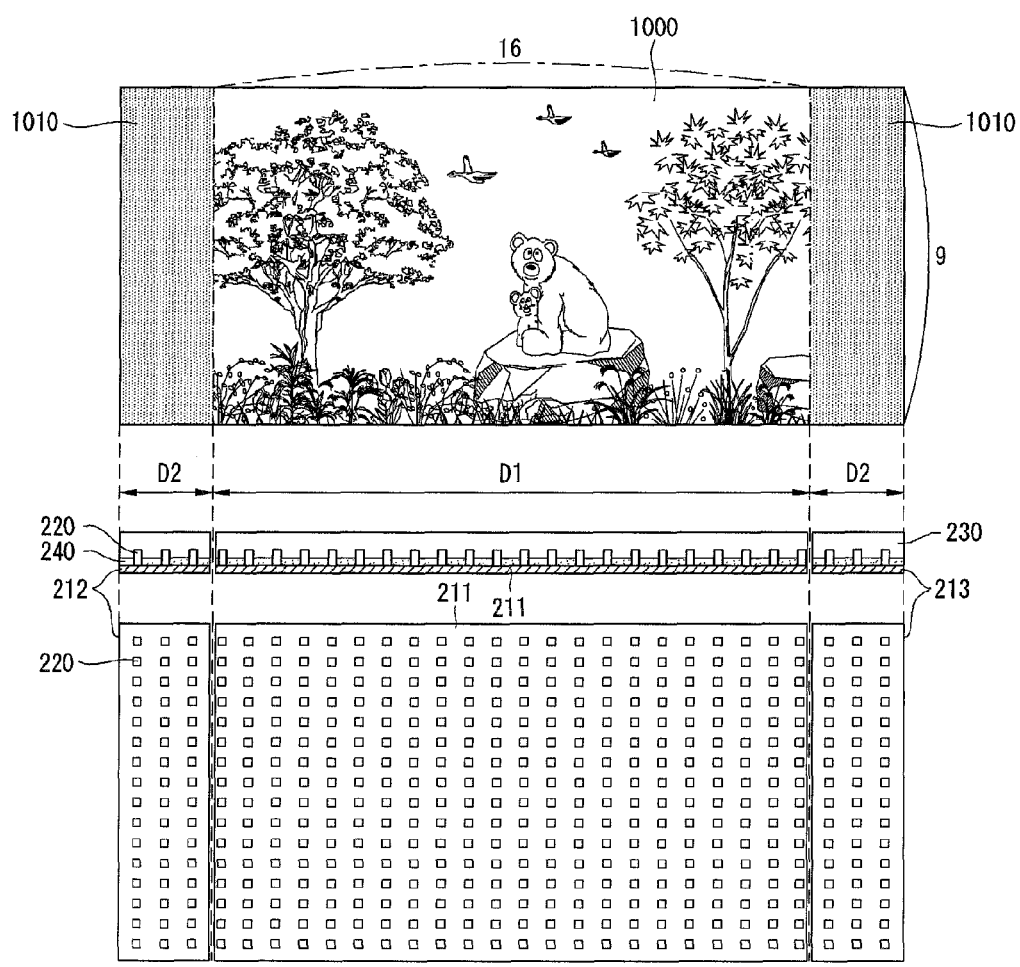

As shown in FIG. 16, the substrate 210 may be divided into a first substrate 211, a second substrate 212, and a third substrate 213. The second substrate 212 and the third substrate 213 may be positioned at the location corresponding to the second region 1010 of the display region of the display panel. The first substrate 211 may be positioned at the location corresponding to the first region 1000.

When the image having the aspect ratio of 16:9 is displayed on the display region of the display panel having the aspect ratio of 21:9, the image having the aspect ratio of 16:9 may be displayed on the first region 1000 of the display region. Thus, the image having the aspect ratio of 16:9 may be implemented by the plurality of light sources 220 positioned on the first substrate 211.

At least one of the plurality of light sources 220 positioned on the second substrate 212 and the third substrate 213 corresponding to the second region 1010, on which the image having the aspect ratio of 16:9 is not displayed, may be turned off. Preferably, all of the light sources 220 positioned on the second substrate 212 and the third substrate 213 may be turned off.

In this instance, when the supply of electric power to the second substrate 212 and the third substrate 213 is cut off, all of the light sources 220 positioned on the second substrate 212 and the third substrate 213 may be turned off. Hence, the display device may be easily driven. Further, because all of the light sources 220 positioned on the second substrate 212 and the third substrate 213 may be simultaneously turned on or off, the structure of lines may be simplified.

Figure 17:
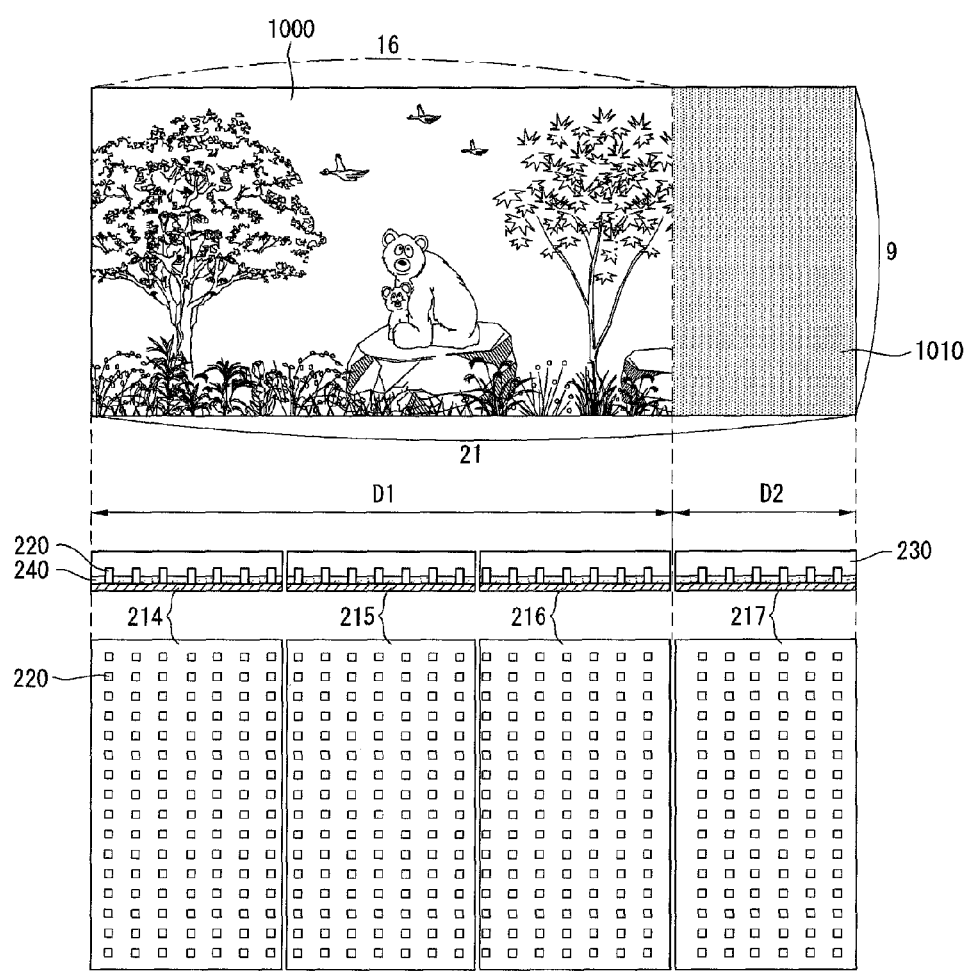

FIG. 17 illustrates an example where the second region 1010 is positioned only on the side of the display region. In the structure illustrated in FIG. 17, the plurality of light sources 220 positioned on one substrate 220 may be turned off based on the aspect ratio of the input video data. In this instance, because the number of substrates corresponding to the second region 1010 may be set to one, the structures of line may be further simplified.

Further, the light sources 220 corresponding to the first region 1000 may be positioned on the different substrates. For example, as shown in FIG. 17, the substrate 220 may be divided into first to fourth substrates 214, 215, 216, and 217. The first to third substrates 214, 215, and 216 may correspond to the first region 1000, and the fourth substrate 217 may correspond to the second region 1010. In an alternative embodiment, reference numerals 214 to 217 may correspond to different sections of a same substrate.

As noted above, when the first to third substrates 214, 215, and 216 correspond to the first region 1000, the structure of lines positioned on each of the first to third substrates 214, 215, and 216 may be further simplified. Further, even if the damaged substrate is generated, only the damaged substrate among the plurality of substrates may be replaced. Therefore, the manufacturing cost may be reduced.

Further, the light sources 220 corresponding to the second region 1010 are not positioned on the first to third substrates 214, 215, and 216 and may be positioned only on the fourth substrate 217. Therefore, the light sources 220 corresponding to the second region 1010 may be turned off by cutting off the supply of electric power to the fourth substrate 217. As a result, the display device may be easily driven.

At least one of the first to third substrates 214, 215, and 216 may have a line pattern different from the other substrates. Further, at least one light source 220 close to the first region 1000 among the plurality of light sources 220 positioned in the second region 1010 may be turned on.

Figure 18:
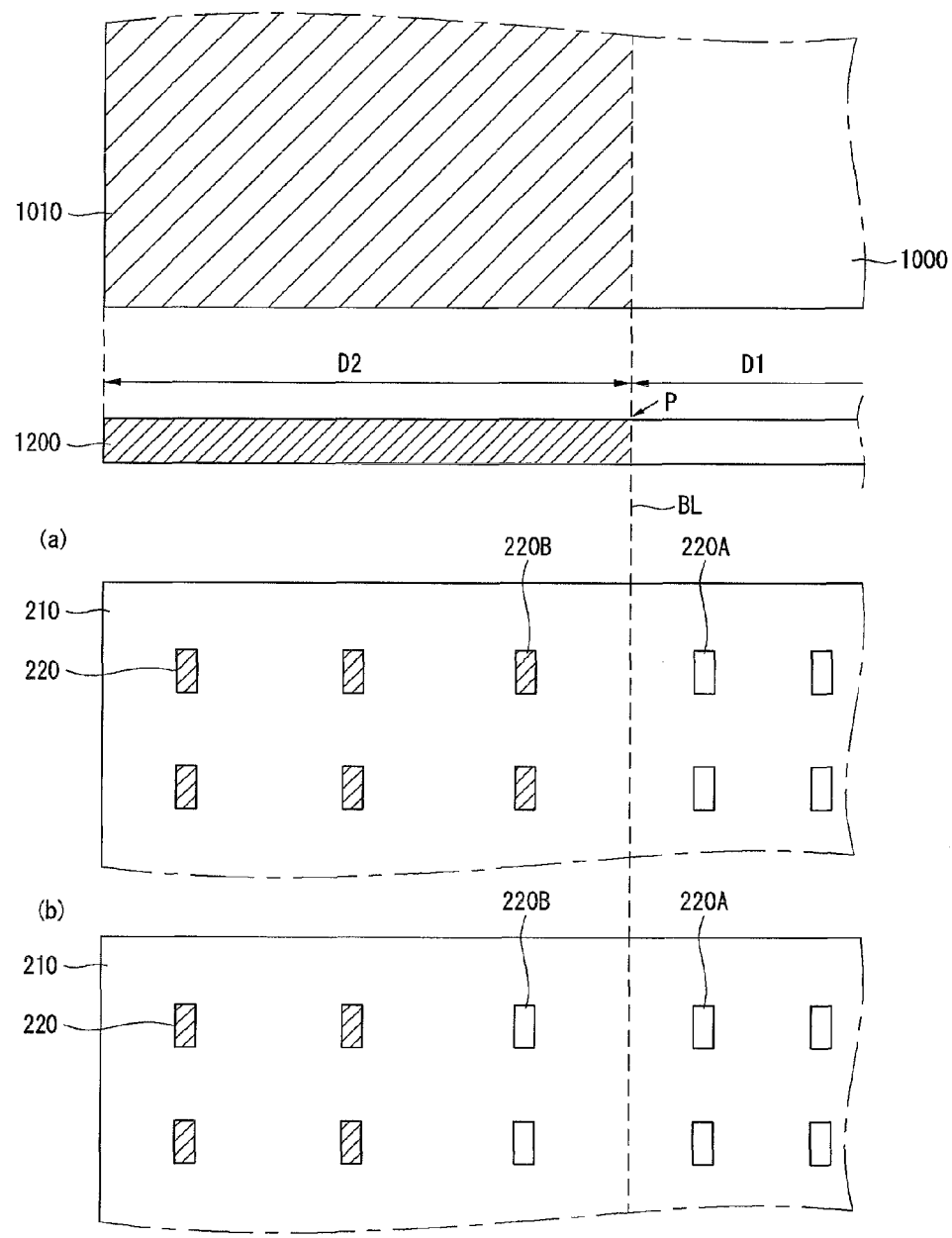

As shown in FIG. 18, a boundary line BL may exist between the first region 1000 and the second region 1010 of the display region of the display panel. Also, a liquid crystal layer 1200 may be divided into an on-region D1 and an off-region D2 by the boundary line BL. In other words, the first region 1000 corresponding to the image display region and the second region 1010 corresponding to the non-display region may be divided by the on-region D1 and the off-region D2 of the liquid crystal layer 1200.

Liquid crystal molecules are rearranged by driving signals supplied to pixel electrodes (not shown) and common electrodes (not shown) on a TFT substrate (not shown) in the on-region D1 of the liquid crystal layer 1200 and are turned on. Because the driving signals are not supplied in the off-region D2 of the liquid crystal layer 1200, the liquid crystal molecules maintain their arrangement state and are turned off.

In FIG. 18, "P" indicates a boundary between the on-region D1 and the off-region D2. As shown in FIG. 18(*a*), the light source 220 closest to the first region 1000 among the plurality of light sources 220 positioned at the location corresponding to the second region 1010 may be turned off. Preferably, all of the light sources 220 positioned at the location corresponding to the second region 1010 may be turned off. Hence, the power consumption may be reduced.

Alternatively, as shown in FIG. 18(*b*), the light source 220 closest to the first region 1000 among the plurality of light sources 220 positioned at the location corresponding to the second region 1010 may be turned on. In other words, the outermost light source 220 closest to the first region 1000 among the plurality of light sources 220 positioned at the location corresponding to the second region 1010 may be turned on. In this instance, an excessive reduction in the luminance may be prevented in a boundary portion between the first region 1000 and the second region 1010. Hence, the image quality may be improved.

Figure 19:
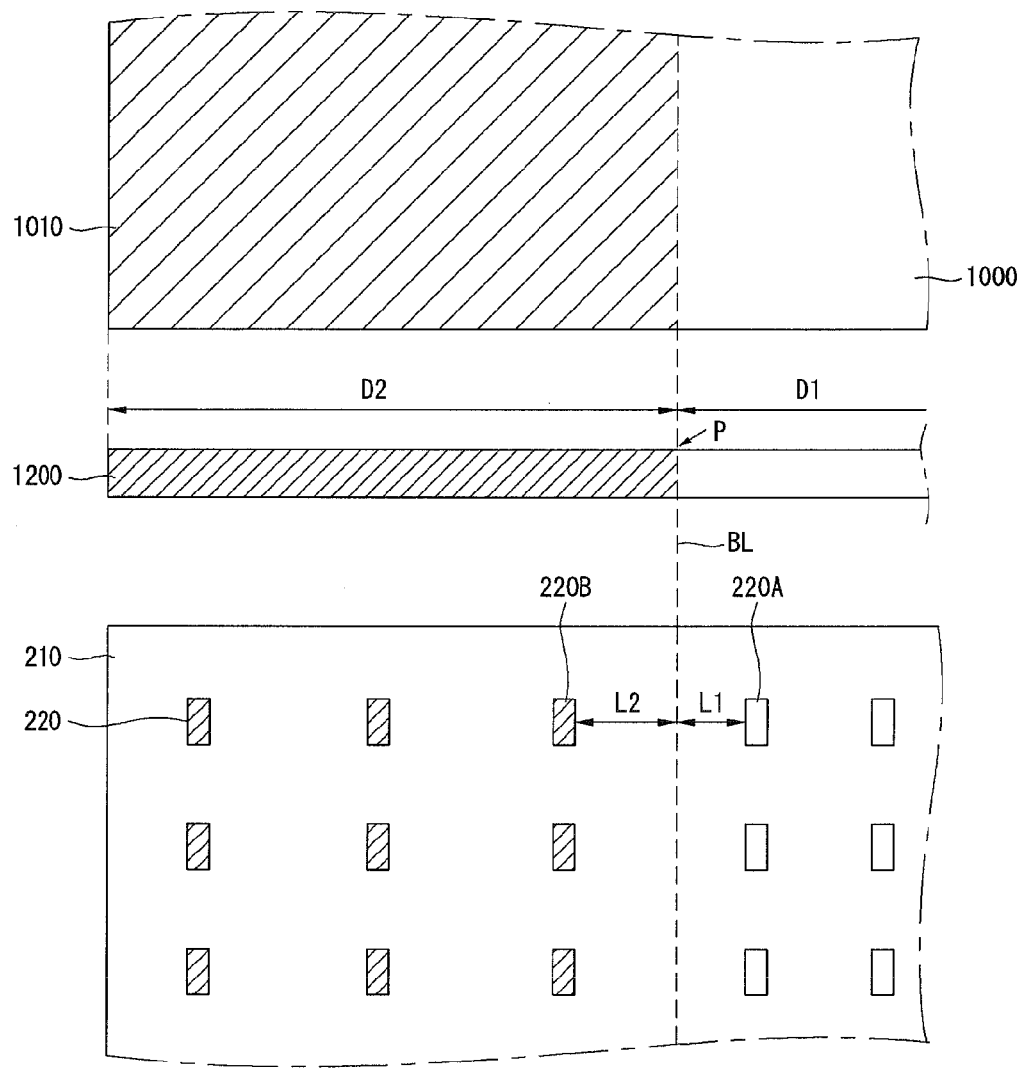

As shown in FIG. 19, when the light source 220 closest to the first region 1000 among the plurality of light sources 220 positioned at the location corresponding to the second region 1010 is turned off, a distance L1 between an outermost light source 220A closest to the second region 1010 among the plurality of light sources 220 positioned at the location corresponding to the first region 1000 and the boundary line BL may be less than a distance L2 between an outermost light source 220B closest to the first region 1000 among the plurality of light sources 220 positioned at the location corresponding to the second region 1010 and the boundary line BL.

In the following description, the outermost light source 220A closest to the second region 1010 among the plurality of light sources 220 positioned at the location corresponding to the first region 1000 is referred to as a first outermost light source 220A, and the outermost light source 220B closest to the first region 1000 among the plurality of light sources 220 positioned at the location corresponding to the second region 1010 is referred to as a second outermost light source 220B.

In this instance, because light emitted from the first outermost light source 220A may sufficiently reach the boundary portion between the first region 1000 and the second region 1010, an excessive reduction in the luminance of the image displayed on the boundary portion between the first region 1000 and the second region 1010 may be prevented.

Figure 20:
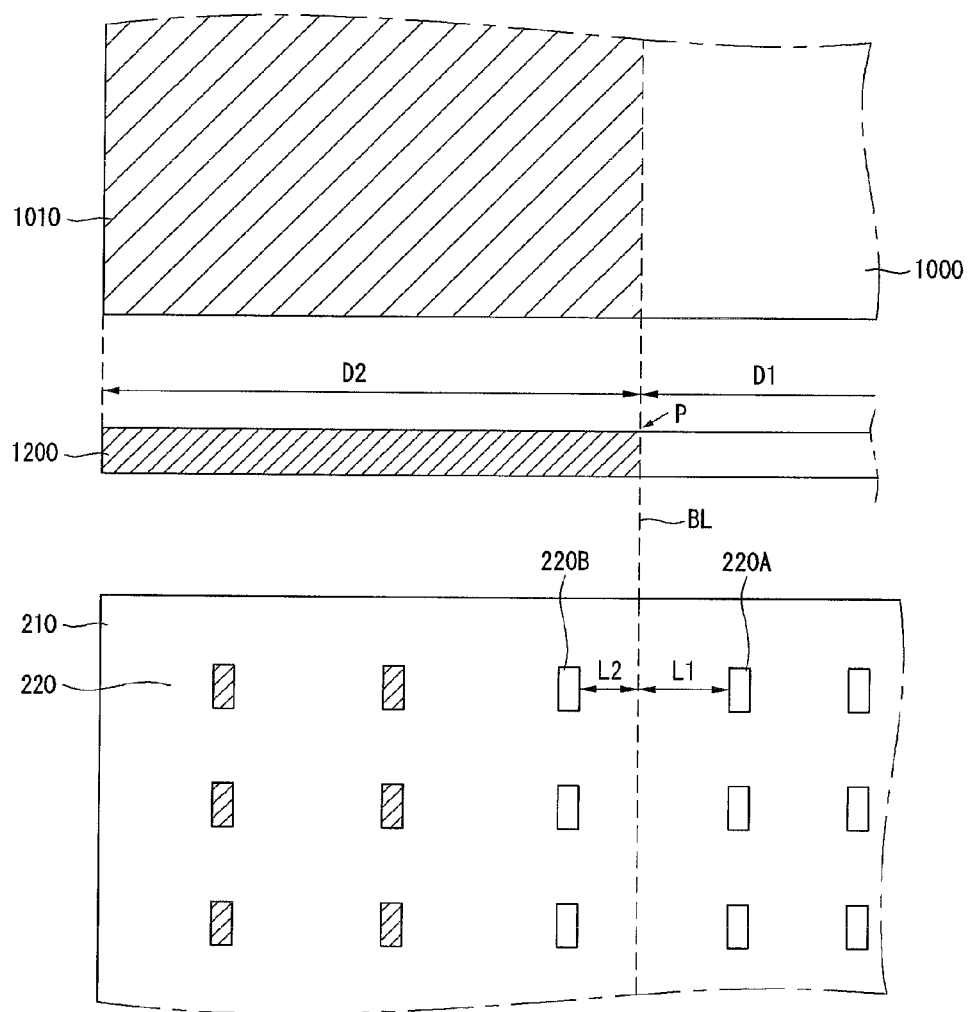

Alternatively, as shown in FIG. 20, when the second outermost light source 220B is turned on, the distance L1 between the first outermost light source 220A and the boundary line BL may be greater than the distance L2 between the second outermost light source 220B and the boundary line BL.

In this instance, before light emitted from the first outermost light source 220A reaches the boundary portion between the first region 1000 and the second region 1010, the intensity of the light emitted from the first outermost light source 220A may be weakened. However, the image may be displayed on the boundary portion between the first region 1000 and the second region 1010 using light emitted from the second outermost light source 220B. Hence, an excessive reduction in the luminance of the image displayed on the boundary portion between the first region 1000 and the second region 1010 may be prevented.

FIGS. 21 to 25 correspond to another embodiment of a method for selectively turning off the light sources of the side view manner based on aspect ratio. The side view manner illustrated in FIGS. 21 to 25 may be applied to the description of FIGS. 14 to 20.

Figure 21:
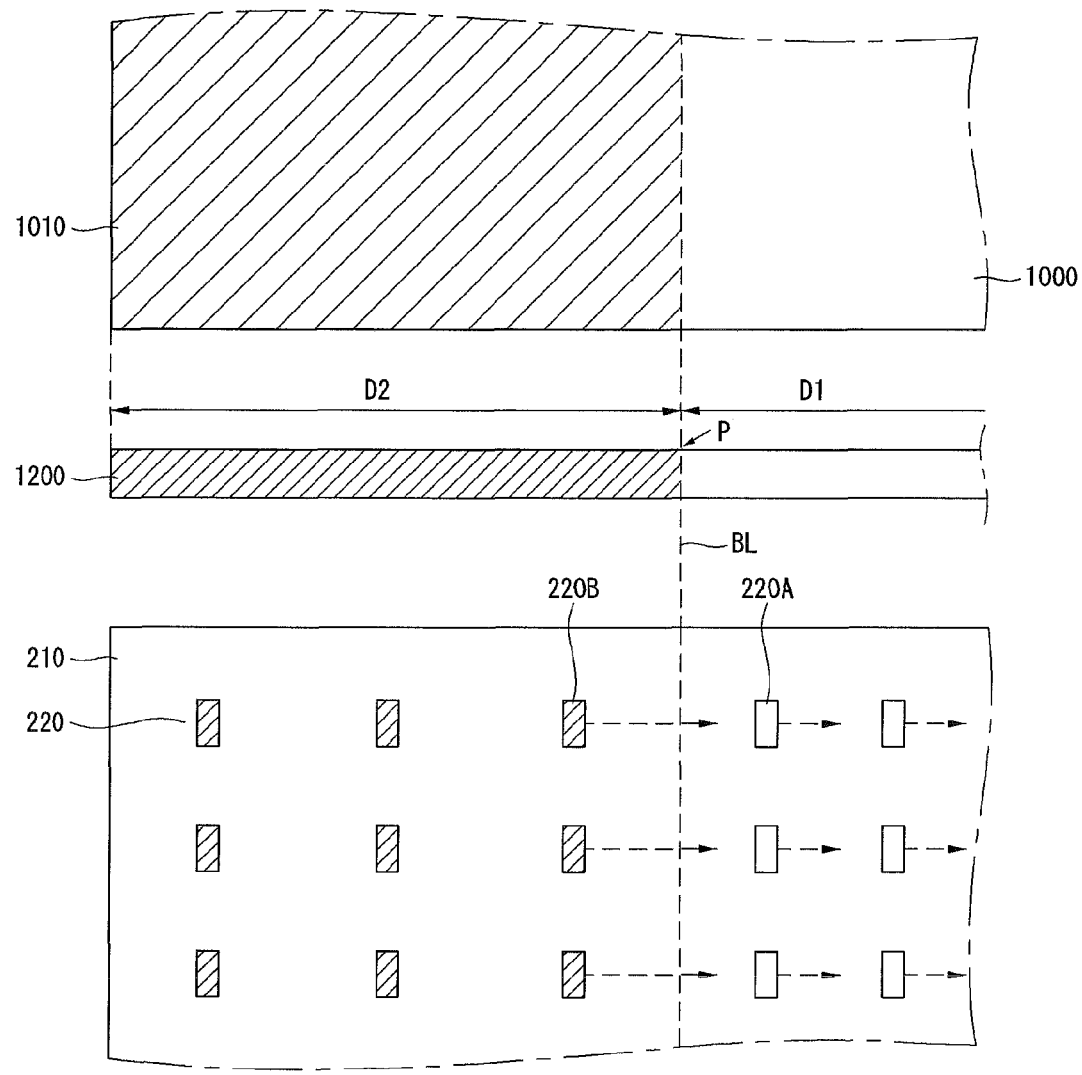
FIGS. 21 to 25 show one embodiment of a method for selectively turning off light sources in a side view manner based on an aspect ratio.

As shown in FIG. 21, the light sources may emit light in a direction parallel to the substrate 210. In other words, the light sources may emit light from the side of the light sources. This has been already described with reference to FIGS. 6 to 8.

As shown in FIG. 21, when the first outermost light source 220A closest to the second region 1010 among the plurality of light sources 220 positioned at the location corresponding to the first region 1000 emits light in the center of the substrate (i.e., in an arrow direction shown in FIG. 21), the second outermost light source 220B closest to the first region 1000 among the plurality of light sources 220 positioned at the location corresponding to the second region 1010 may be turned on. In this case, the excessive reduction in the luminance of the image displayed on the boundary portion between the first region 1000 and the second region 1010 may be prevented.

Figure 22:
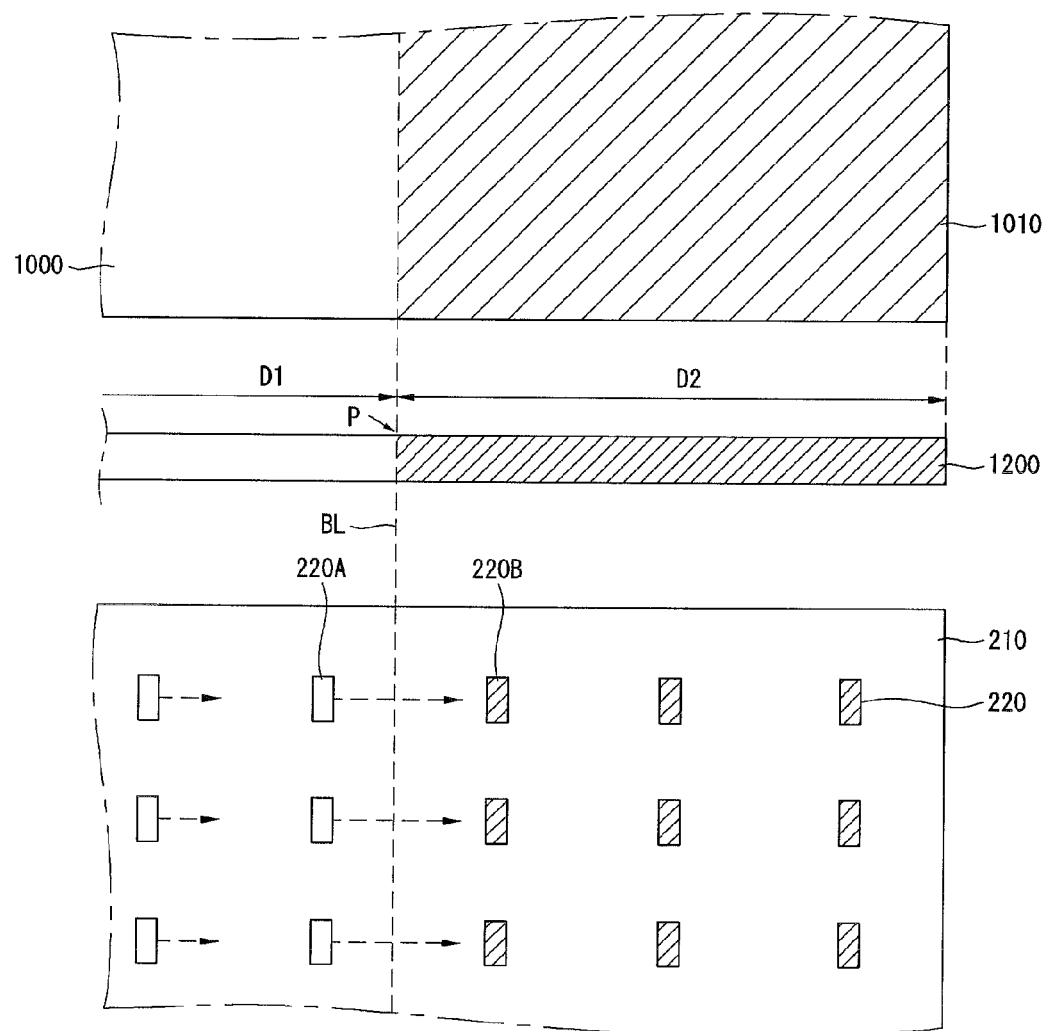

Further, as shown in FIG. 22, the first outermost light source 220A may emit light in an outer direction of the substrate 210, i.e., in a direction toward the second region 1010 (i.e., in an arrow direction shown in FIG. 22), so as to prevent the excessive reduction in the luminance of the image displayed on the boundary portion between the first region 1000 and the second region 1010. In this instance, the second outermost light source 220B may be turned off.

Figure 23:
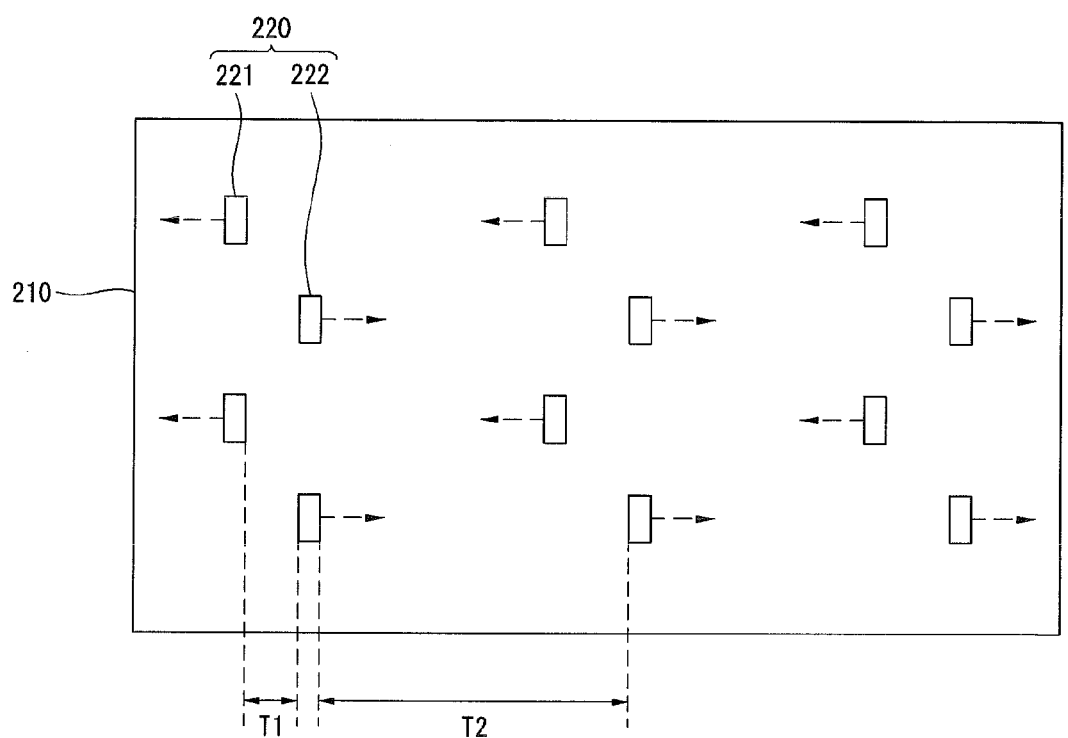

As shown in FIG. 23, at least one of the plurality of light sources 220 positioned on the substrate 210 may emit light in a direction different from the other light sources. For example, when a first light source 221 of the plurality of light sources 220 emits light to the left of the substrate 210, a second light source 222 of the plurality of light sources 220 may emit light to the right of the substrate 210. A light emitting direction of the light sources 220 is not limited to that illustrated in FIG. 23.

For example, the backlight unit 200 may include the first and second light sources 221 and 222 emitting light in a direction parallel to an X-axis (i.e., to the side of the light sources 221 and 222). The first and second light sources 221 and 222 may be disposed adjacent to each other in a direction of a Y-axis crossing the X-axis. Namely, as shown in FIG. 23, the first and second light sources 221 and 222 may be diagonally disposed adjacent to each other.

The first and second light sources 221 and 222 may emit light in the opposite directions. For example, the first light source 221 may emit light in the opposite direction of the X-axis, and the second light source 222 may emit light in the direction of the X-axis. In this instance, the light sources included in the backlight unit 200 may emit light in the lateral direction. For this, the light sources included in the backlight unit 200 may be configured using the side view type LED package.

Further, as shown in FIG. 23, the plurality of light sources of the backlight unit 200 may be arranged in two or more rows, and the two or more light sources positioned on the same row may emit light in the same direction. For example, the adjacent light sources positioned on the left and right sides of the first light source 221 on the same row may emit light in the same direction as the first light source 221, i.e., in the opposite direction of the X-axis. Further, the adjacent light sources positioned on the left and right sides of the second light source 222 on the same row may emit light in the same direction as the second light source 222, i.e., in the direction of the X-axis.

As described above, because the light sources (for example, the first and second light sources 221 and 222) positioned adjacently to one another in the direction of the Y-axis emit light in the opposite directions, the luminance of light may be prevented from being concentrated or reduced in a specific region of the backlight unit 200. In other words, as light emitted from the first light source 221 travels to the light source adjacent to the first light source 221, the intensity of the light emitted from the first light source 221 may be weakened.

Hence, as a distance between the first light source 221 and the specific region of the backlight unit 200 increases, the luminance of light emitted from the specific region of the backlight unit 200 in the direction of the display panel may be reduced. Accordingly, as shown in FIG. 23, because the first and second light sources 221 and 222 emit light in the opposite directions, the luminance of light may be prevented from being concentrated in a region adjacent to the light source and may be prevented from being reduced in a region distance from the light source. As a result, the luminance of light emitted from the backlight unit 200 may be uniform.

When a distance T1 between the first light source 221 and the second light source 222 excessively increases, an area where light emitted from the first light source 221 or the second light source 222 does not reach may be generated. Hence, the luminance of light in the area may be greatly reduced.

Further, when the distance T1 between the first light source 221 and the second light source 222 excessively decreases, interference between light emitted from the first light source 221 and light emitted from the second light source 222 may be generated. Hence, the division driving efficiency of the light sources may be reduced.

Accordingly, the distance T1 between the first light source 221 and the second light source 222 emitting the light in the opposite directions may be less than a distance T2 between the two adjacent second light sources 222 or a distance between the two adjacent first light sources 221, so as to reduce the interference between the light sources 220, and at the same time, to uniformize the luminance of light emitted from the backlight unit 200. Preferably, the distance T1 between the first light source 221 and the second light source 222 may be approximately 9 mm to 27 mm.

Figure 24:
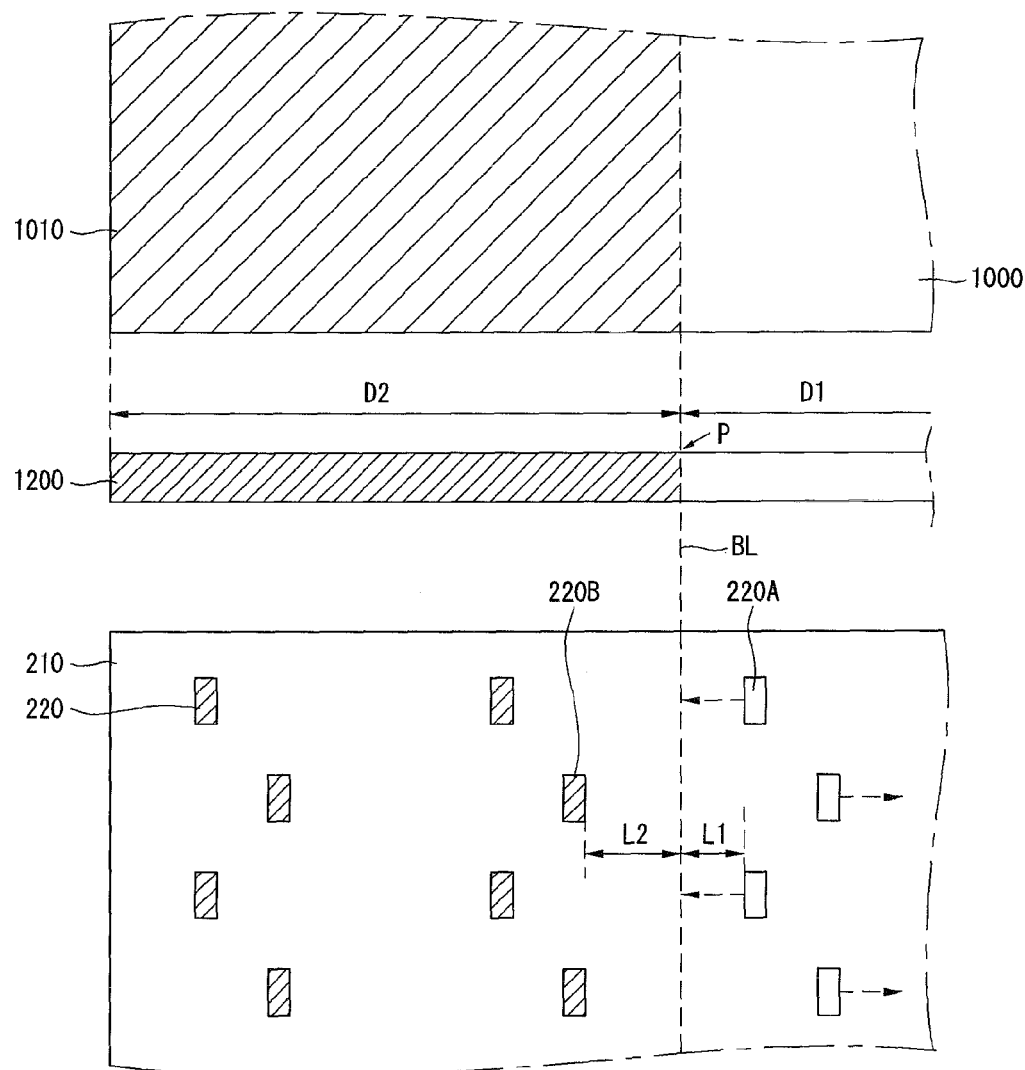

As shown in FIG. 24, even in the side view manner, the second outermost light source 220B closest to the first region 1000 among the plurality of light sources 220 positioned at the location corresponding to the second region 1010 may be turned off. Preferably, all of the light sources 220 positioned in the second region 1010 may be turned off.

Further, the first outermost light source 220A closest to the second region 1010 among the plurality of light sources 220 positioned at the location corresponding to the first region 1000 may emit light in the outer direction of the substrate 210, i.e., in the direction toward the second region 1010. In this instance, because the first outermost light source 220A emits light in the boundary portion between the first region 1000 and the second region 1010, the excessive reduction in the luminance of the image displayed on the boundary portion between the first region 1000 and the second region 1010 may be prevented.

When the first outermost light source 220A emits light in the direction toward the second region 1010, the distance L1 between the first outermost light source 220A and the boundary line BL may be less than the distance L2 between the second outermost light source 220B and the boundary line BL, so that light emitted from the first outermost light source 220A sufficiently reaches the boundary portion between the first region 1000 and the second region 1010.

Figure 25:
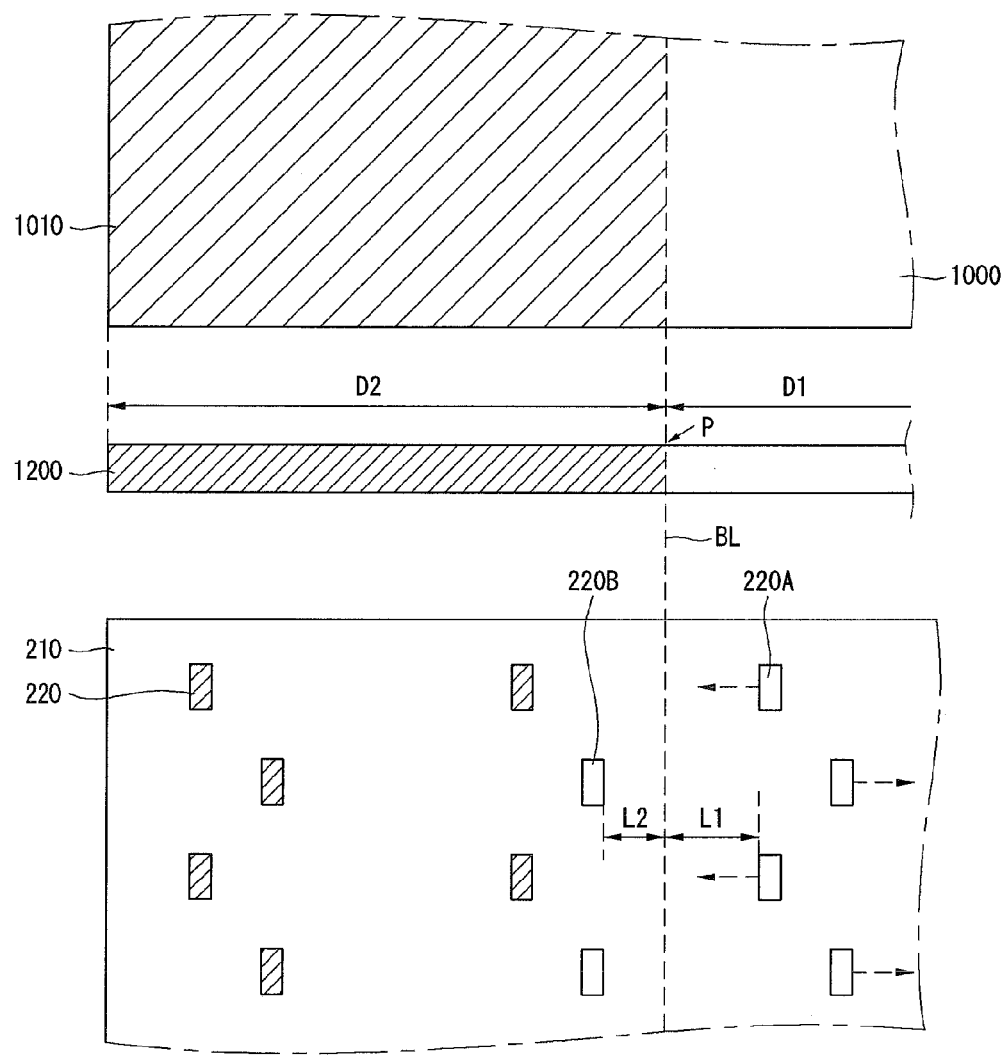

Alternatively, as shown in FIG. 25, the second outermost light source 220B closest to the first region 1000 among the plurality of light sources 220 positioned at the location corresponding to the second region 1010 may be turned on, so that the excessive reduction in the luminance of the image displayed on the boundary portion between the first region 1000 and the second region 1010 is prevented in the side view manner. In this instance, the distance L1 between the first outermost light source 220A and the boundary line BL may be greater than the distance L2 between the second outermost light source 220B and the boundary line BL.

In FIGS. 24 and 25, the first outermost light source 220A is a light source emitting light in the direction toward the second region 1010, and the second outermost light source 220B is a light source emitting light in the center of the substrate 210, i.e., in the opposite direction of the second region 1010. The first outermost light source 220A may correspond to the first light source 221 shown in FIG. 23, and the second outermost light source 220B may correspond to the second light source 222 shown in FIG. 23.

Figure 26:
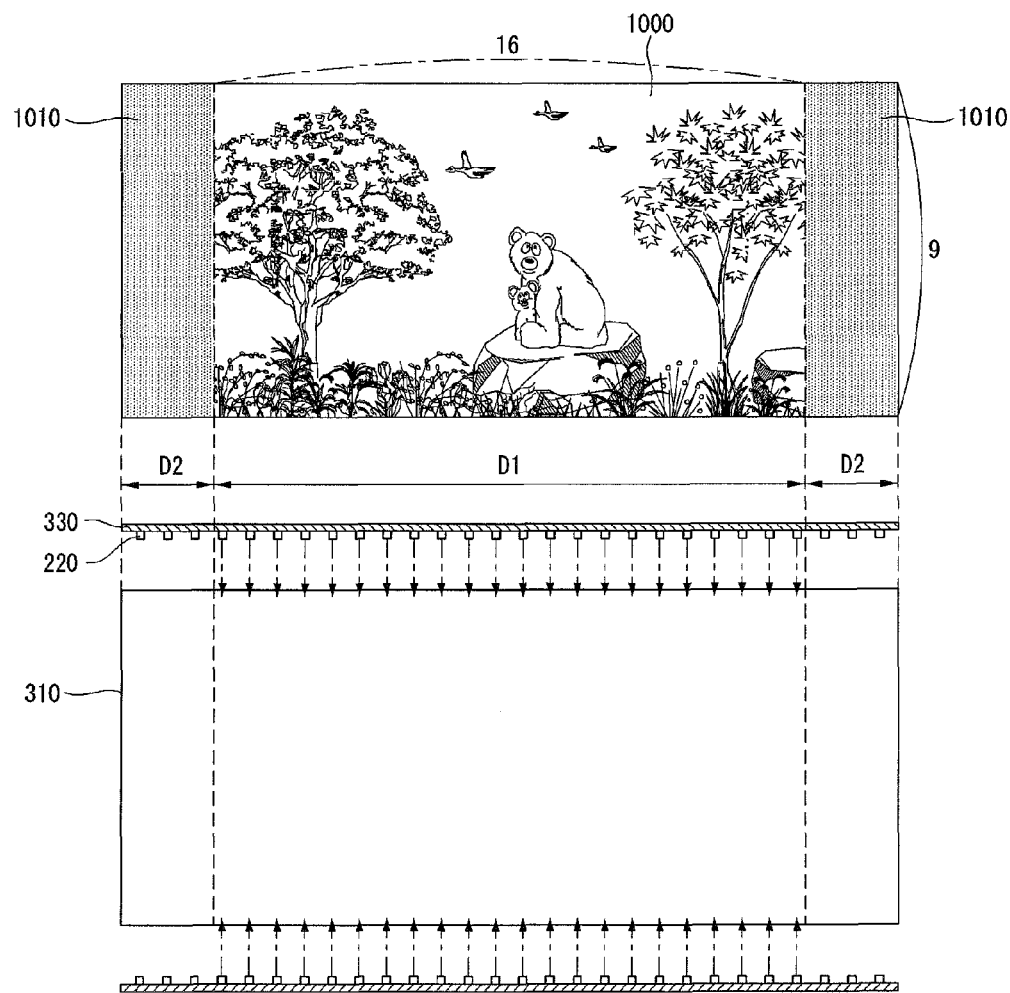
FIGS. 26 to 29 show one embodiment of a method for selectively turning off light sources based on aspect ratio in backlight unit performing edge light emissions.

FIGS. 26 to 29 show another embodiment of a method for selectively turning off light sources based on an aspect ratio in an edge light emitting manner. As shown in FIG. 26, the light sources 220 may be positioned on the side of a light guide plate 330 and may emit light toward the light guide plate 330. The edge light emitting manner has been already described with reference to FIG. 9.

Even in the edge light emitting manner, at least one light source 220 positioned at the location corresponding to the second region 1010 may be turned off.

As above, even in the edge light emitting manner, two light sources have to be independently driven so as to turn off at least one light source based on an aspect ratio of input video data. For example, as shown in FIG. 27, the plurality of light sources 220 may be electrically connected to a first line 1300, and the plurality of light sources 220 may be electrically connected to a second line 1310 electrically separated from the first line 1300.

Figure 27:
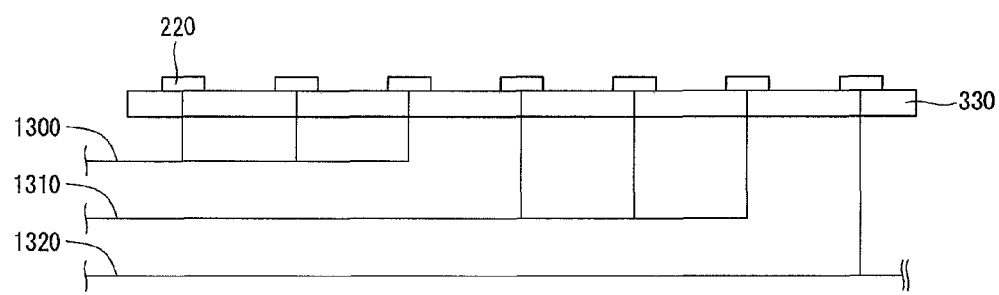

In the structure illustrated in FIG. 27, when the electric power is supplied to the first line 1300 and the supply of the electric power to the second line 1310 is cut off, the plurality of light sources 220 connected to the first line 1300 may be turned on, and the plurality of light sources 220 connected to the second line 1310 may be turned off. As a result, even in the edge light emitting manner, at least one of the plurality of light sources 220 may be turned off based on the aspect ratio of the input video data through the above-described method.

Figure 28:
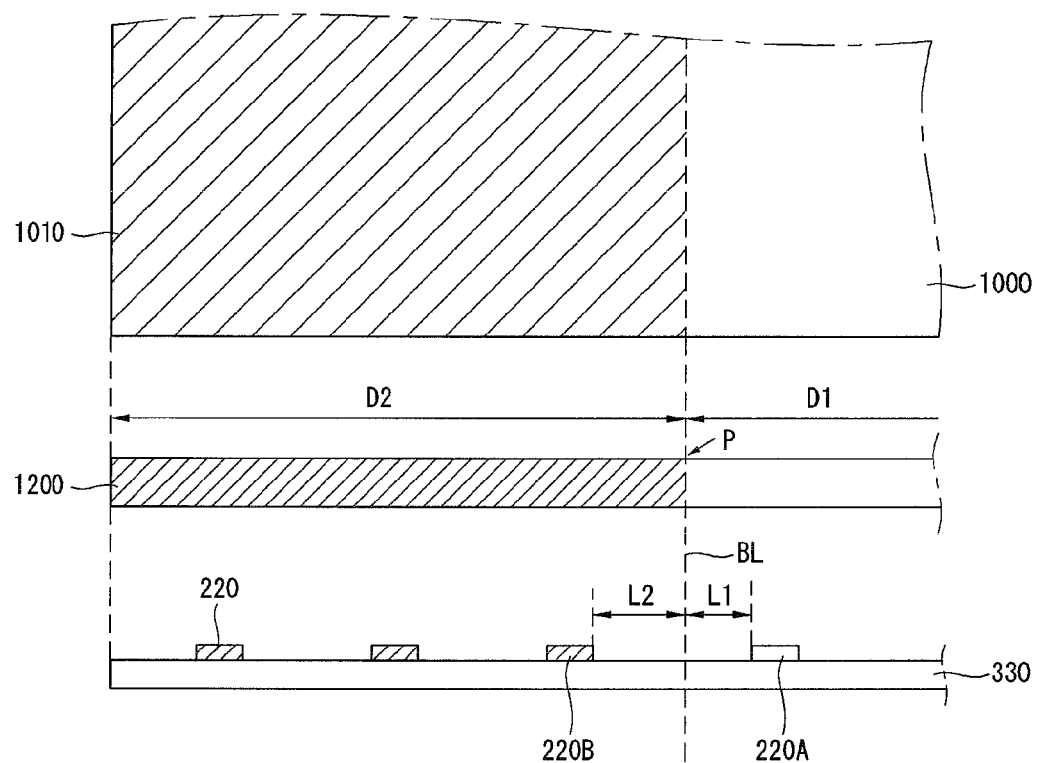
Figure 29:
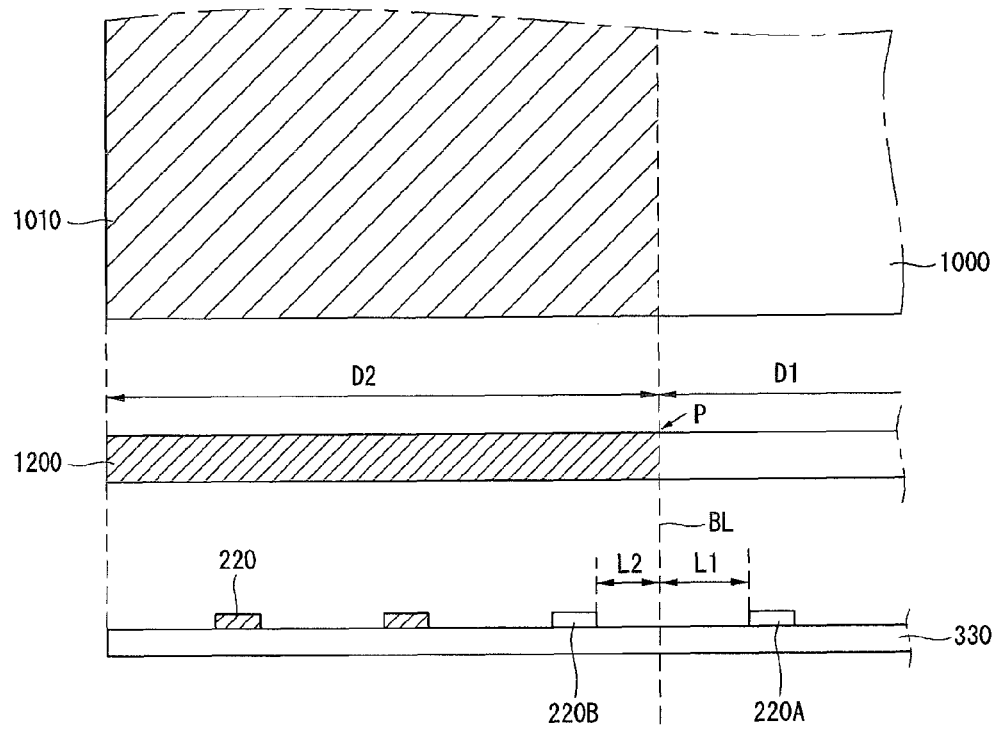

As shown in FIG. 28, the second outermost light source 220B closest to the first region 1000 among the plurality of light sources 220 positioned at the location corresponding to the second region 1010 may be turned off in the boundary portion between the first region 1000 and the second region 1010. Preferably, all of the light sources 220 positioned in the second region 1010 may be turned off.

In this instance, it may be preferable that the distance L1 between the first outermost light source 220A closest to the second region 1010 among the plurality of light sources 220 positioned at the location corresponding to the first region 1000 and the boundary line BL is less than the distance L2 between the second outermost light source 220B and the boundary line BL.

Further, because light emitted from the first outermost light source 220A may sufficiently reach the boundary portion between the first region 1000 and the second region 1010, the excessive reduction in the luminance of the image displayed on the boundary portion between the first region 1000 and the second region 1010 may be prevented.

Alternatively, as shown in FIG. 20, the second outermost light source 220B may be turned on, so that the excessive reduction in the luminance of the image displayed on the boundary portion between the first region 1000 and the second region 1010 is prevented in the edge light emitting manner. In this instance, the distance L1 between the first outermost light source 220A and the boundary line BL may be greater than the distance L2 between the second outermost light source 220B and the boundary line BL.

Figure 30:
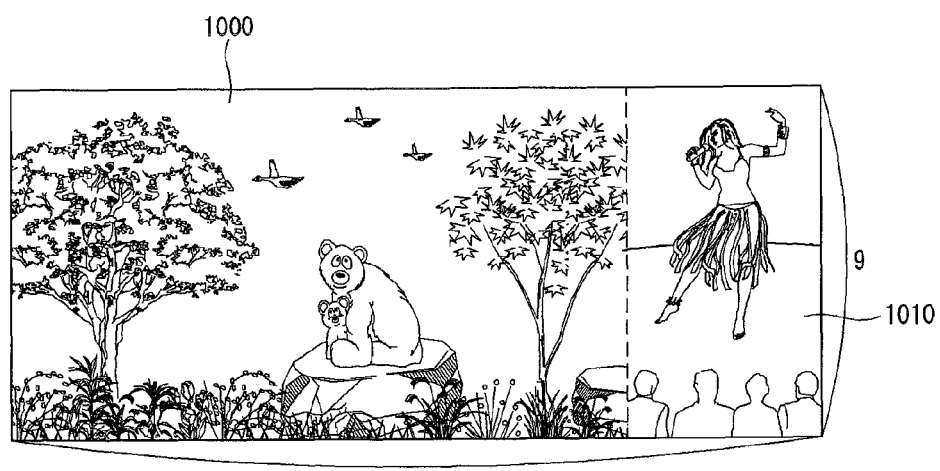
FIGS. 30 to 33 show another image displayed on a second region.

FIGS. 30 to 33 illustrate an example where another image is displayed on the second region. As shown in FIG. 30, an image of broadcast information such as an electronic program guide (EPG), internet information, etc. may be displayed on the second region 1010 of the display region of the display panel, unlike the above-described configuration in which the image is not displayed on the second region 1010. Further, the image having the aspect ratio different from the aspect ratio of the display panel may be displayed on the first region 1000 of the display region.

Unlike the above-described configuration in which the image is not displayed on the second region 1010, the light sources 220 positioned at the location corresponding to the second region 1010 have to be turned on so as to display the image of the broadcast information, the internet information, etc. on the second region 1010.

In this instance, it may be preferable that the luminance of the second region 1010 decreases so as to more remarkably display the image on the first region 1000 than the image on the second region 1010. For example, the luminance of the image displayed on the second region 1010 may decrease by setting a gain of video data of the broadcast information, the internet information, etc. supplied to the second region 1010 to be less than a gain of video data supplied to the first region 1000.

Alternatively, the luminance of the image displayed on the second region 1010 may decrease by reducing the voltage supplied to the light sources 220 positioned at the location corresponding to the second region 1010.

Figure 31:
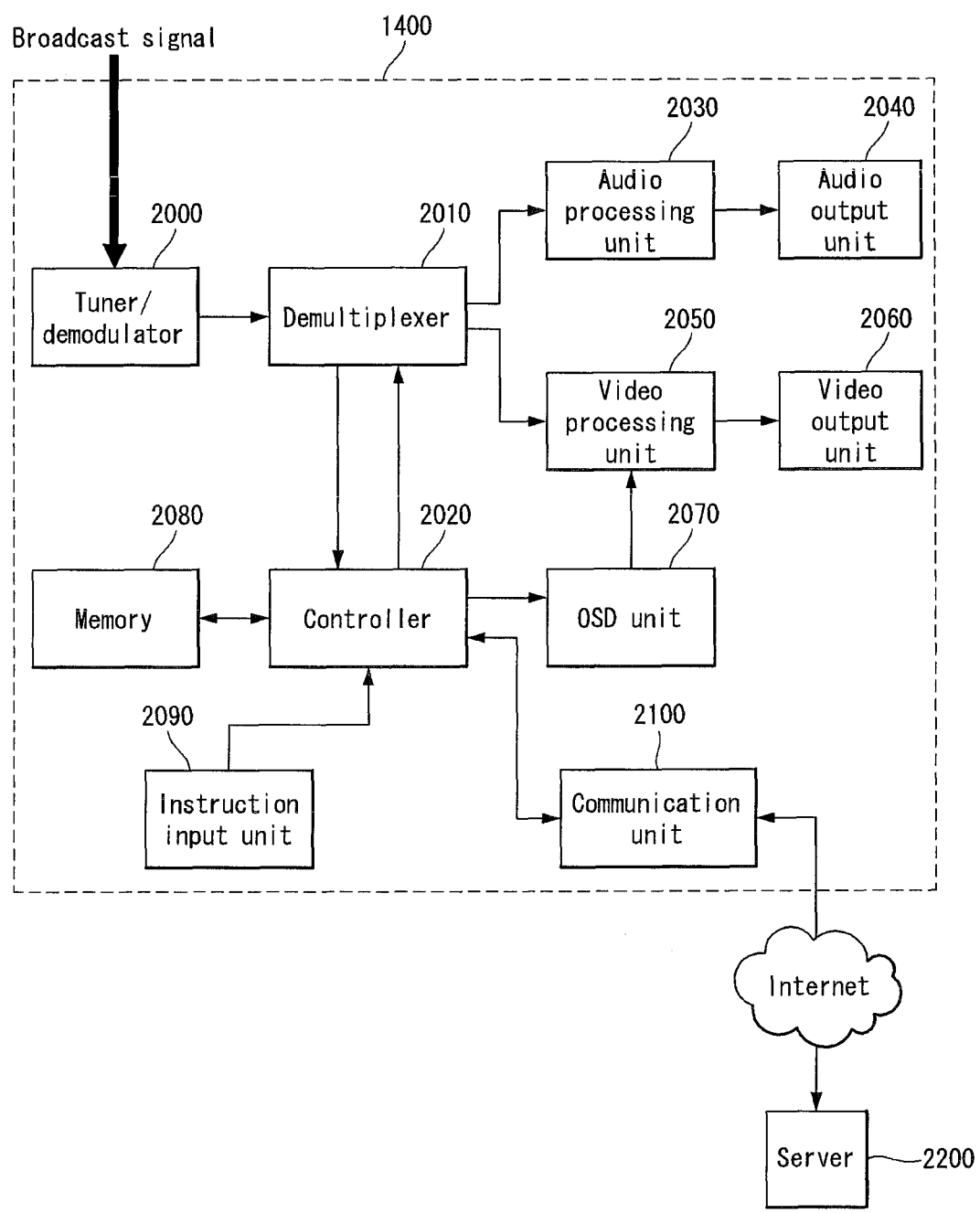

FIG. 31 shows one embodiment of a broadcast signal receiver. As shown in FIG. 31, a broadcast signal receiver 1400 may include a tuner/demodulator 2000, a demultiplexer 2010, a controller 2020, an audio processing unit 2030, an audio output unit 2040, a video processing unit 2050, a video output unit 2060, an on-screen display (OSD) unit 2070, a memory 2080, an instruction input unit 2090, and a communication unit 2100.

The tuner/demodulator 2000 may receive a broadcast signal from a broadcasting station and demodulate the broadcast signal. Because the tuner/demodulator 2000 demodulates the received broadcast signal, the tuner/demodulator 2000 may be referred to as a decoder.

The demultiplexer 2010 may separate the received broadcast signal into a video signal, an audio signal, and a data signal based on attributes of the broadcast signal.

The audio processing unit 2030 may process the audio signal separated by the demultiplexer 2010 as a signal which a viewer can listen.

The audio output unit 2040 may output the audio signal processed by the audio processing unit 2030. Further, the audio output unit 2040 may output the audio signal based on the broadcast signal. The audio output unit 2040 may be a speaker.

The video processing unit 2050 may process the video signal separated by the demultiplexer 2010 as a signal which the viewer can view.

The video output unit 2060 may output the video signal processed by the video processing unit 2050. The video output unit 2060 may be the display panel according to one embodiment.

The OSD unit 2070 may output a signal (i.e., an OSD signal) indicating characters and figures to be displayed on the video output unit 2060. In the following description, the signal output by the OSD unit 2070 is referred to as an OSD signal. The OSD unit 2070 may produce the OSD signal included in the broadcast signal and may transmit the OSD signal to the video processing unit 2050. The OSD unit 2070 may produce information on data received in a widget format.

The video processing unit 2050 may composite the OSD signal (including a widget signal) and the video signal of the broadcast signal. The video processing unit 2050 may output a composite signal composited by the video output unit 2060 as a signal which the viewer can view.

The controller 2020 may control each of the components and may control the broadcast signal.

The memory 2080 may store data of information on the broadcast signal.

The instruction input unit 2090 may perform an instruction corresponding to an operation of the viewer. Examples of the instruction input unit 2090 include a keyboard, a remote controller, etc.

The communication unit 2100 may communicate information with an internet sever 2200. The communication unit 2100 may receive information on the broadcast signal from an internet network. The communication unit 2100 may receive the broadcast signal from the internet network.

When the broadcast signal is received, the controller 2020 may confirm information on the aspect ratio of the image included in the broadcast signal. The information on the aspect ratio of the image may be included in the electronic program guide (EPG) and may be transmitted.

Next, the controller 2020 may compare the aspect ratio of the image of the received broadcast signal with a previously determined aspect ratio of the display region of the display panel, i.e., the video output unit 2060. When the aspect ratio of the image of the received broadcast signal is different from the previously determined aspect ratio of the display region of the video output unit 2060, the video output unit 2060 may output the image through the method illustrated in FIGS. 11 to 13.

Further, if the user inputs an instruction to display the broadcast information such as the EPG or the internet information on the second region 1010, the video output unit 2060 may display the image of the broadcast information such as the EPG or the internet information on the second region 1010. In this instance, the video processing unit 2050 may reduce the gain of the video data displayed on the second region 1010 under the control of the controller 2020.

Further, the video processing unit 2050 may reduce the voltage supplied to the light sources 220 positioned at the location corresponding to the second region 1010 under the control of the controller 2020 to thereby reduce the luminance of the image displayed on the second region 1010.

The image of the broadcast information such as the EPG or the internet information may be displayed on a portion of the second region 1010, and the image may not be displayed on the remaining portion of the second region 1010.

Figure 32:
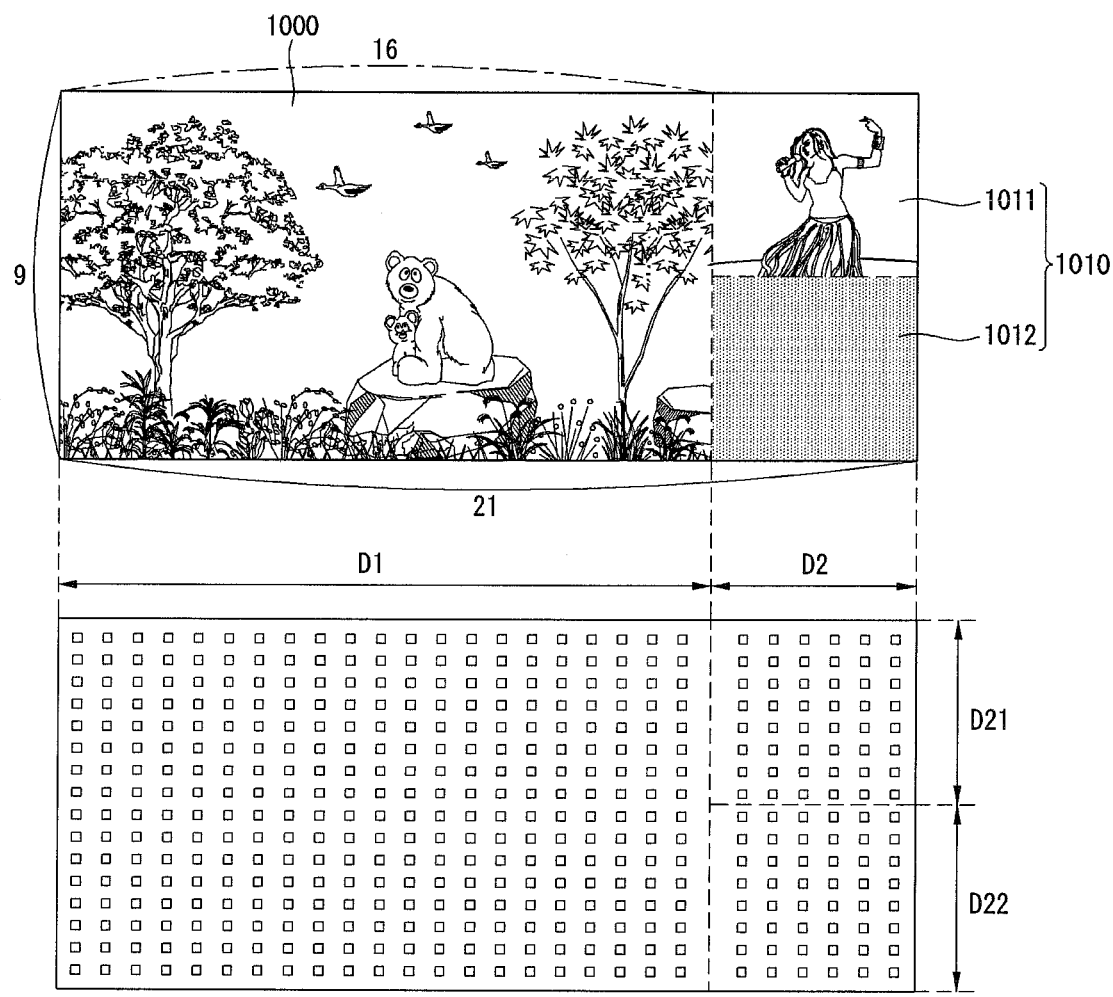

For example, as shown in FIG. 32, when the second region 1010 includes a 2-1 region 1011 and a 2-2 region 1012, the image of the broadcast information or the internet information may be displayed on the 2-1 region 1011 and the image may not be displayed on the 2-2 region 1012.

In this instance, the light sources 220 positioned at a location D21 corresponding to the 2-1 region 1011 may be turned on, and the light sources 220 positioned at a location D22 corresponding to the 2-2 region 1012 may be turned off. Further, the voltage supplied to the light sources 220 positioned at the location D21 corresponding to the 2-1 region 1011 may be less than the voltage supplied to the light sources 220 positioned at a location D1 corresponding to the first region 1000.

As above, any two light sources at the location corresponding to the second region 1010 have to be independently driven, so that the light sources 220 positioned at the location D21 corresponding to the 2-1 region 1011 are turned on, and the light sources 220 positioned at the location D22 corresponding to the 2-2 region 1012 are turned off.

Figure 33:
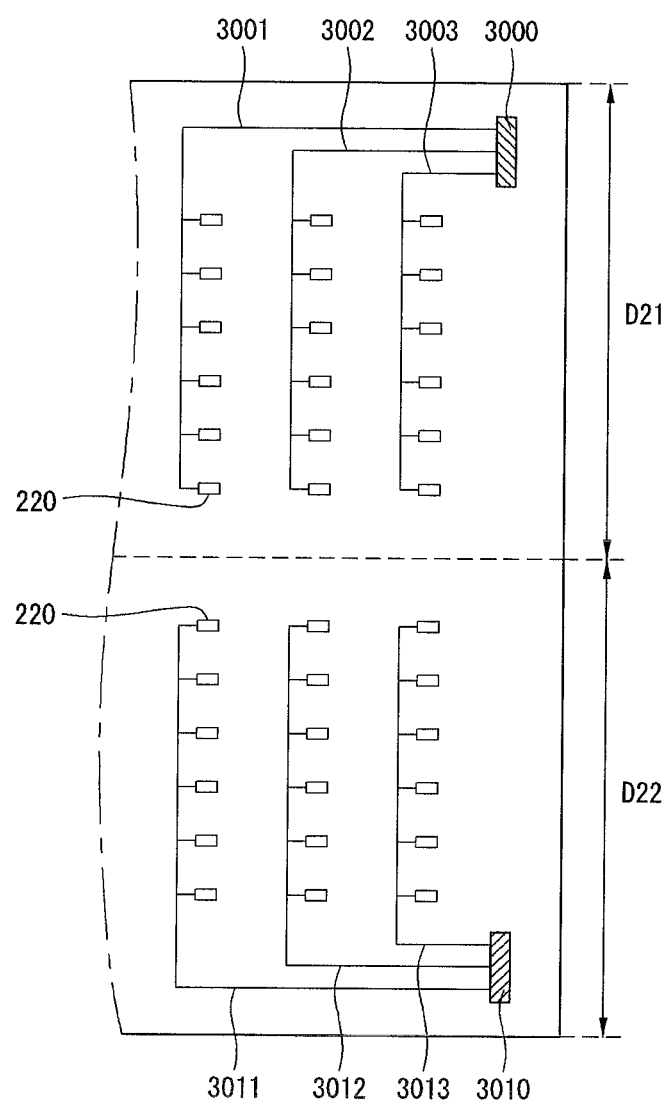

For example, as shown in FIG. 33, in the location D21 corresponding to the 2-1 region 1011 of the second region 1010, the light sources 220 may be electrically connected to a first line 3001, the light sources 220 may be electrically connected to a second line 3002 electrically separated from the first line 3001, and the light sources 220 may be electrically connected to a third line 3003.

Further, in the location D22 corresponding to the 2-2 region 1012 of the second region 1010, the light sources 220 may be electrically connected to a tenth line 3011, the light sources 220 may be electrically connected to an eleventh line 3012 electrically separated from the tenth line 3011, and the light sources 220 may be electrically connected to a twelfth line 3013.

The structure illustrated in FIG. 33, when the electric power is supplied to the first, second, and third lines 3001-3003 and the supply of the electric power to the tenth, eleventh, and twelfth lines 3011-3013 is cut off, the light sources 220 connected to the first, second, and third lines 3001-3003 may be turned on, and the light sources 220 connected to the tenth, eleventh, and twelfth lines 3011-3013 may be turned off. Further, at least one of the light sources 220 may be turned off based on the aspect ratio of the video data input to the locations D21 and D22 corresponding to the second region 1010 through the method illustrated in FIG. 33. In FIG. 33, reference numerals 3000 and 3010 denote a connector.

Thus, one embodiment described herein provides a display module comprising a display panel including a liquid crystal layer, the display panel having a display region having a first aspect ratio, and a plurality of light sources configured to emit light to the display panel, wherein when a video data having a second aspect ratio different from the first aspect ratio is supplied, an image having the second aspect ratio is displayed on a first region of the display region of the display panel, wherein a luminance of the first region is different from a luminance of a second region of the display region of the display panel.

Another embodiment provides a display module comprising a display panel including a liquid crystal layer, the display panel having a display region having an aspect ratio of 21:9, and a plurality of light sources configured to emit light to the display panel, wherein the display region of the display panel includes a first region displaying an image having an aspect ratio of 16:9 or 4:3 and a second region adjacent to the first region, wherein a luminance of the second region is less than a luminance of the first region at the same gray level.

In accordance with another embodiment, display module comprises a display panel having a screen with a first aspect ratio; and a plurality of light sources to emit light to the display panel, wherein the screen includes a first region and a second region, wherein an image with a second aspect ratio different from the first aspect ratio is displayed in the first region and not in the second region, and wherein one or more light sources corresponding to the second region are selectively turned off, so that luminance of the first region is different from luminance of a second region.

In addition, an aspect ratio of the first region may be substantially equal to the second aspect ratio, and the luminance of the second region is less than the luminance of the first region. Luminance of the second region may be less than the luminance of the first region at a same gray level.

In addition, the plurality of light sources are direct type light sources which emit light in a direction substantially parallel to the screen.

In addition, a light source corresponding to the first region which is adjacent the second region may emit light toward light sources corresponding to the second region.

In addition, or alternatively, a light source corresponding to the first region and a light source may corresponding to the second region may emit light in different directions.

In addition, or alternatively, a light source corresponding to the first region may face light sources in the second region and a light source corresponding to the second region may face light sources in the first region. A distance between the light source corresponding to the first region and a boundary between the first and second regions may be different from a distance between the light source corresponding to the second region and the boundary between the first and second regions.

In addition, at least one light source corresponding to the second region may be turned on and emit light in a direction toward the light sources corresponding to the first region.

In addition, the first aspect ratio is one of 21:9, 16:9, or 4:3.

In addition, at least a portion of the light sources corresponding to the second region may be selectively turned on to display an image different from the image displayed in the first region.

In addition, the second region may have substantially a same height and a different width from the first region, or the second region may have substantially a same width and a different height from the first region.

In addition, the light sources corresponding to the first and second regions may be coupled to different substrates. Also, one or more light sources corresponding to the second region may emit light to illuminate the image in the first region and wherein other light sources corresponding to the second region may be selectively turned off.

In addition, the light sources may include a plurality of first light sources that emit light in a first direction, and a plurality of second light sources that emit light in a second direction, wherein the pluralities of first and second light sources are alternately arranged and wherein a first distance between adjacent first and second light sources is different from a second distance between adjacent first light sources.

In accordance with anther embodiment, a display module comprises a display panel having a screen with 21:9 aspect ratio; and a plurality of light sources to emit light to the display panel, wherein the screen includes a first region displaying an image having an aspect ratio of 16:9 or 4:3 and a second region adjacent to the first region, and wherein light sources corresponding to the second region are selectively turned off so that a luminance of the second region is less than a luminance of the first region.

In addition, at least one light source corresponding to the second region may be turned on, and a light source corresponding to the first region and a light source corresponding to the second region may emit light in different directions.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with one or more features of the remaining embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display module comprising:
a display panel having a screen with a first aspect ratio; and
a plurality of light sources to emit light to the display panel,
wherein the screen includes a first region and a second region,
wherein an image with a second aspect ratio different from the first aspect ratio is displayed in the first region and not in the second region, and
wherein one or more light sources corresponding to the second region are selectively turned off, so that luminance of the first region is different from luminance of a second region,
wherein the light sources include:
a plurality of first light sources that emit light in a first direction, and
a plurality of second light sources that emit light in a second direction, wherein the pluralities of first and second light sources are alternately arranged, and wherein a first distance between adjacent first and second light sources is different from a second distance between adjacent first light sources.

2. The display module of claim 1, wherein an aspect ratio of the first region is substantially equal to the second aspect ratio.

3. The display module of claim 1, wherein the luminance of the second region is less than the luminance of the first region.

4. The display module of claim 3, wherein the luminance of the second region is less than the luminance of the first region at a same gray level.

5. The display module of claim 1, wherein the plurality of light sources are direct type light sources which emit light in a direction substantially parallel to the screen.

6. The display module of claim 5, wherein a light source corresponding to the first region which is adjacent the second region emits light toward light sources corresponding to the second region.

7. The display module of claim 5, wherein a light source corresponding to the first region and a light source corresponding to the second region emit light in different directions.

8. The display module of claim 5, wherein a light source corresponding to the first region faces light sources in the second region and a light source corresponding to the second region faces light sources in the first region.

9. The display module of claim 8, wherein a distance between the light source corresponding to the first region and a boundary between the first and second regions is different from a distance between the light source corresponding to the second region and the boundary between the first and second regions.

10. The display module of claim 1, wherein at least one light source corresponding to the second region is turned on and emits light in a direction toward the light sources corresponding to the first region.

11. The display module of claim 1, wherein the first aspect ratio is one of 21:9, 16:9, or 4:3.

12. The display module of claim 1, wherein at least a portion of the light sources corresponding to the second region are selectively turned on to display an image different from the image displayed in the first region.

13. The display module of claim 1, wherein the second region has substantially a same height and a different width from the first region.

14. The display module of claim 1, wherein the second region has substantially a same width and a different height from the first region.

15. The display module of claim 1, wherein the light sources corresponding to the first and second regions are coupled to different substrates.

16. The display module of claim 1, wherein one or more light sources corresponding to the second region emit light to illuminate the image in the first region and wherein other light sources corresponding to the second region are selectively turned off.

17. A display module comprising:
a display panel having a screen with 21:9 aspect ratio; and
a plurality of light sources to emit light to the display panel,
wherein the screen includes a first region displaying an image having an aspect ratio of 16:9 or 4:3 and a second region adjacent to the first region, and wherein light sources corresponding to the second region are selectively turned off so that a luminance of the second region is less than a luminance of the first region,
wherein the light sources include:
a plurality of first light sources that emit light in a first direction, and
a plurality of second light sources that emit light in a second direction,
wherein the pluralities of first and second light sources are alternately arranged, and wherein a first distance between adjacent first and second light sources is different from a second distance between adjacent first light sources.

18. The display module of claim 17, wherein at least one light source corresponding to the second region is turned on.

19. The display module of claim 17, wherein a light source corresponding to the first region and a light source corresponding to the second region emit light in different directions.

* * * * *